(12) United States Patent  
Ishii

(10) Patent No.: US 8,610,950 B2  
(45) Date of Patent: Dec. 17, 2013

(54) IMAGE PROCESSING APPARATUS, IMAGE PROCESSING METHOD, AND COMPUTER-READABLE RECORDING MEDIUM STORING IMAGE PROCESSING PROGRAM FOR GENERATING COLOR TONE CORRECTION PARAMETER

(75) Inventor: Hiroshi Ishii, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 704 days.

(21) Appl. No.: 12/801,034

(22) Filed: May 18, 2010

(65) Prior Publication Data

US 2010/0309498 A1 Dec. 9, 2010

(30) Foreign Application Priority Data

Jun. 5, 2009 (JP) .................................. 2009-136559

(51) Int. Cl.
 *H04N 1/60* (2006.01)
 *G06K 15/02* (2006.01)
 *H04N 1/40* (2006.01)

(52) U.S. Cl.
 CPC ............ *G06K 15/02* (2013.01); *H04N 1/40062* (2013.01)
 USPC ................. 358/1.9; 358/2.1; 358/530; 399/29

(58) Field of Classification Search
 USPC ............. 358/1.9, 504, 518, 501; 347/19, 171; 399/27, 28, 29, 31, 33, 53; 382/167
 See application file for complete search history.

(56) References Cited

U.S. PATENT DOCUMENTS

| | | | | |
|---|---|---|---|---|
| 5,835,243 A | * | 11/1998 | Mori .............................. | 358/518 |
| 6,490,053 B1 | * | 12/2002 | Takahashi et al. ............ | 358/1.18 |
| 6,556,707 B1 | | 4/2003 | Yagishita et al. | |
| 7,088,472 B1 | | 8/2006 | Okubo et al. | |
| 7,583,409 B2 | * | 9/2009 | Morgana et al. ............... | 358/1.9 |
| 7,777,915 B2 | * | 8/2010 | Kuo et al. ...................... | 358/1.9 |
| 2003/0020776 A1 | * | 1/2003 | Franzke et al. ................ | 347/19 |
| 2003/0086090 A1 | * | 5/2003 | Tandon et al. ................ | 356/419 |
| 2003/0179395 A1 | * | 9/2003 | Kodama et al. ................ | 358/1.9 |
| 2004/0174403 A1 | * | 9/2004 | Yoshida et al. ................ | 347/15 |

(Continued)

FOREIGN PATENT DOCUMENTS

| | | | | |
|---|---|---|---|---|
| JP | 3241986 | | 10/2001 | |
| JP | 2003250045 | * | 9/2003 | ............... H04N 1/46 |

(Continued)

OTHER PUBLICATIONS

Abstract of JP 09-186900 published Jul. 15, 1997.

(Continued)

*Primary Examiner* — Jerome Grant, II
(74) *Attorney, Agent, or Firm* — Harness, Dickey & Pierce, P.L.C.

(57) ABSTRACT

An image processing apparatus is disclosed that includes a printing procedure request portion configured to request printing of color tone image data in a state where a patch row is arranged in a direction almost parallel with a main scanning direction; an image data obtaining portion configured to obtain scanned color tone data, showing scanned value of the patch row, from a scanning portion configured to optically scan the patch row; and a parameter generating portion configured to generate a color tone correction parameter for correcting color tone value of photoconductive image data by comparing the scanned color tone data and the color tone image data.

13 Claims, 29 Drawing Sheets

(56) References Cited

U.S. PATENT DOCUMENTS

| | | |
|---|---|---|
| 2004/0174574 A1* | 9/2004 | Okuda ............................ 358/504 |
| 2004/0257622 A1 | 12/2004 | Shibaki et al. |
| 2005/0141057 A1* | 6/2005 | Kumada et al. ............... 358/504 |
| 2005/0240366 A1* | 10/2005 | Mestha et al. .................. 702/76 |
| 2006/0077466 A1 | 4/2006 | Ishii et al. |
| 2007/0127837 A1 | 6/2007 | Ishii |
| 2007/0177231 A1* | 8/2007 | Wang et al. .................... 358/504 |
| 2007/0258102 A1* | 11/2007 | Bielak et al. ................... 358/1.9 |
| 2008/0204773 A1* | 8/2008 | Morgana et al. ............... 358/1.9 |
| 2008/0239349 A1* | 10/2008 | Kaneko .......................... 358/1.9 |
| 2009/0003696 A1* | 1/2009 | Ishii et al. ...................... 382/167 |
| 2009/0086230 A1* | 4/2009 | Reed .............................. 358/1.9 |
| 2009/0086290 A1* | 4/2009 | Ming et al. .................... 358/501 |
| 2010/0118347 A1 | 5/2010 | Ishii |
| 2010/0128099 A1* | 5/2010 | Evans ............................ 347/171 |

FOREIGN PATENT DOCUMENTS

| | | | |
|---|---|---|---|
| JP | 2006-262204 | 9/2006 | |
| JP | 2007-264364 | 10/2007 | |
| JP | 2007-264731 | 10/2007 | |
| JP | 2008-066923 | 3/2008 | |
| JP | 2010105311 | * 5/2010 | ............... H04N 1/60 |

OTHER PUBLICATIONS

Japanese Office Action for JP 2009-136559 issued Jan. 22, 2013.

* cited by examiner

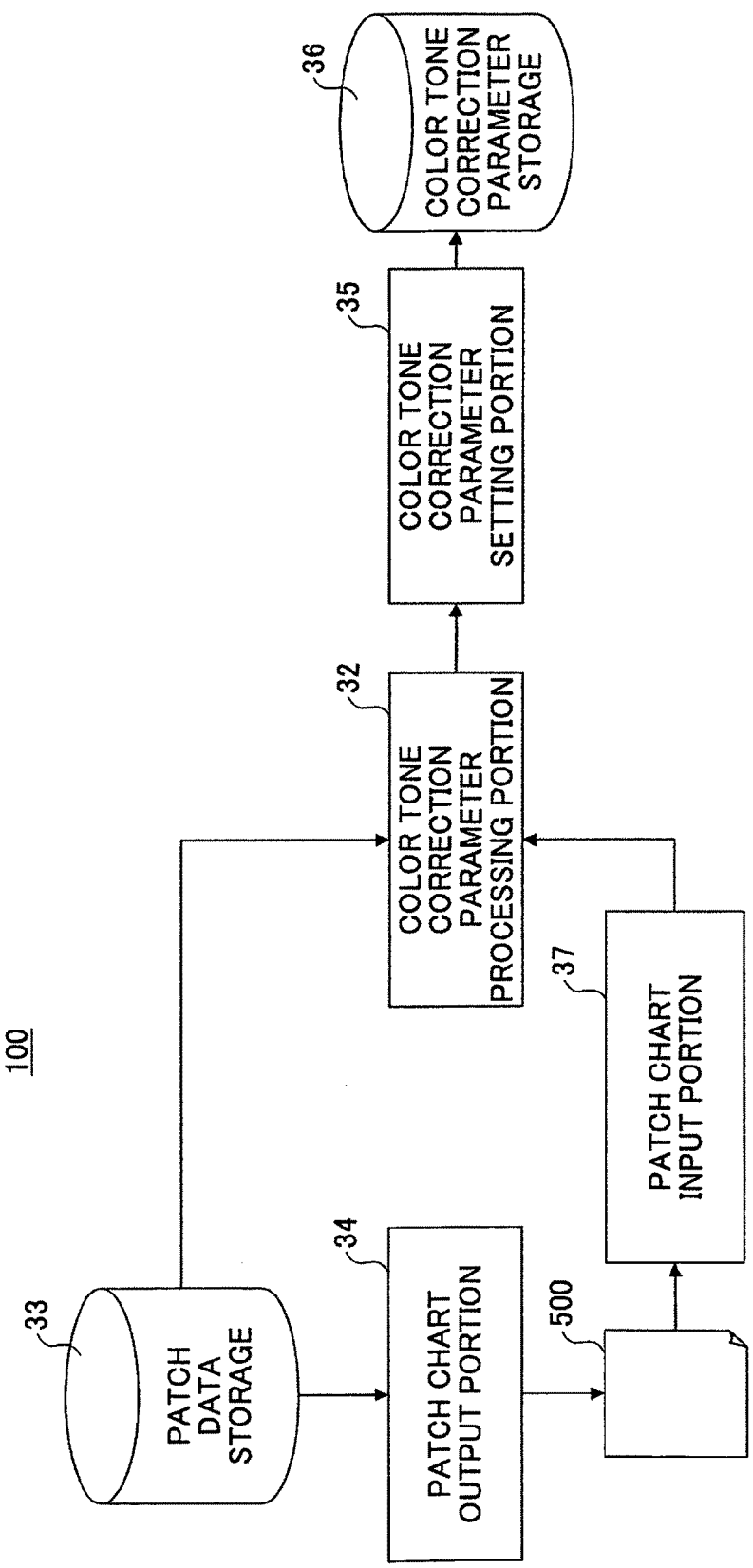

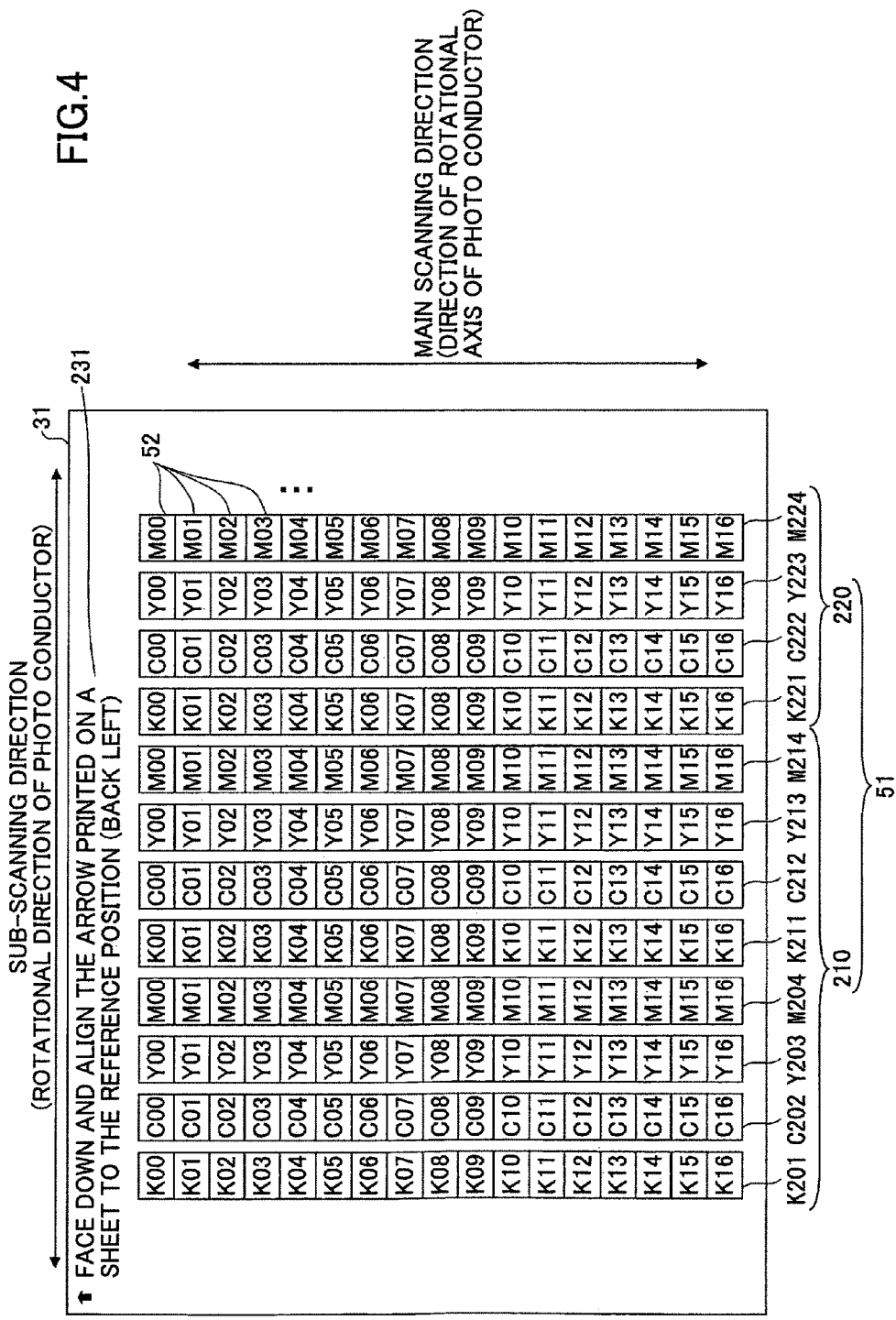

FIG.5

| PATCH | COLOR TONE VALUE |
|---|---|
| K00 | 0 |
| K01 | 16 |
| K02 | 32 |
| K03 | 48 |
| K04 | 64 |
| K05 | 80 |
| K06 | 96 |
| K07 | 112 |
| K08 | 128 |
| K09 | 143 |
| K10 | 159 |
| K11 | 175 |
| K12 | 191 |
| K13 | 207 |
| K14 | 223 |
| K15 | 239 |
| K16 | 255 |

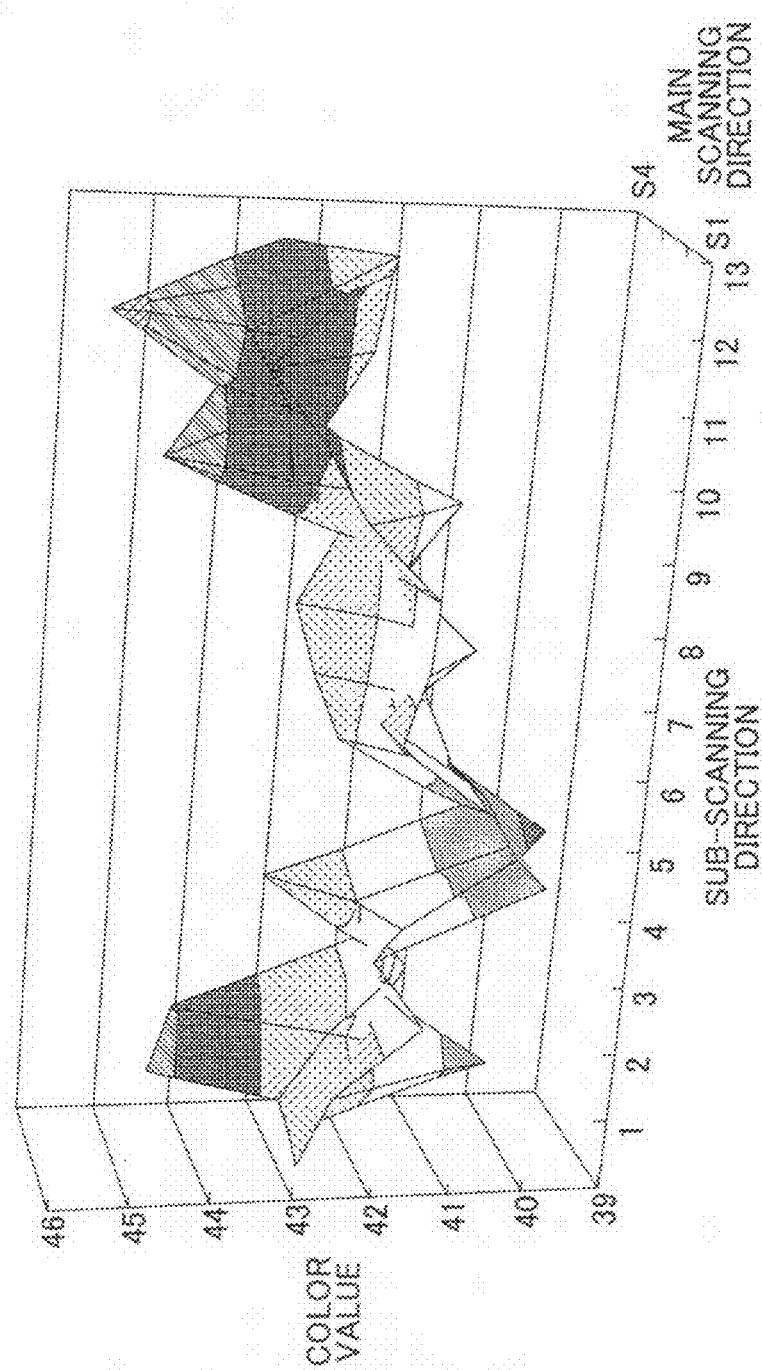

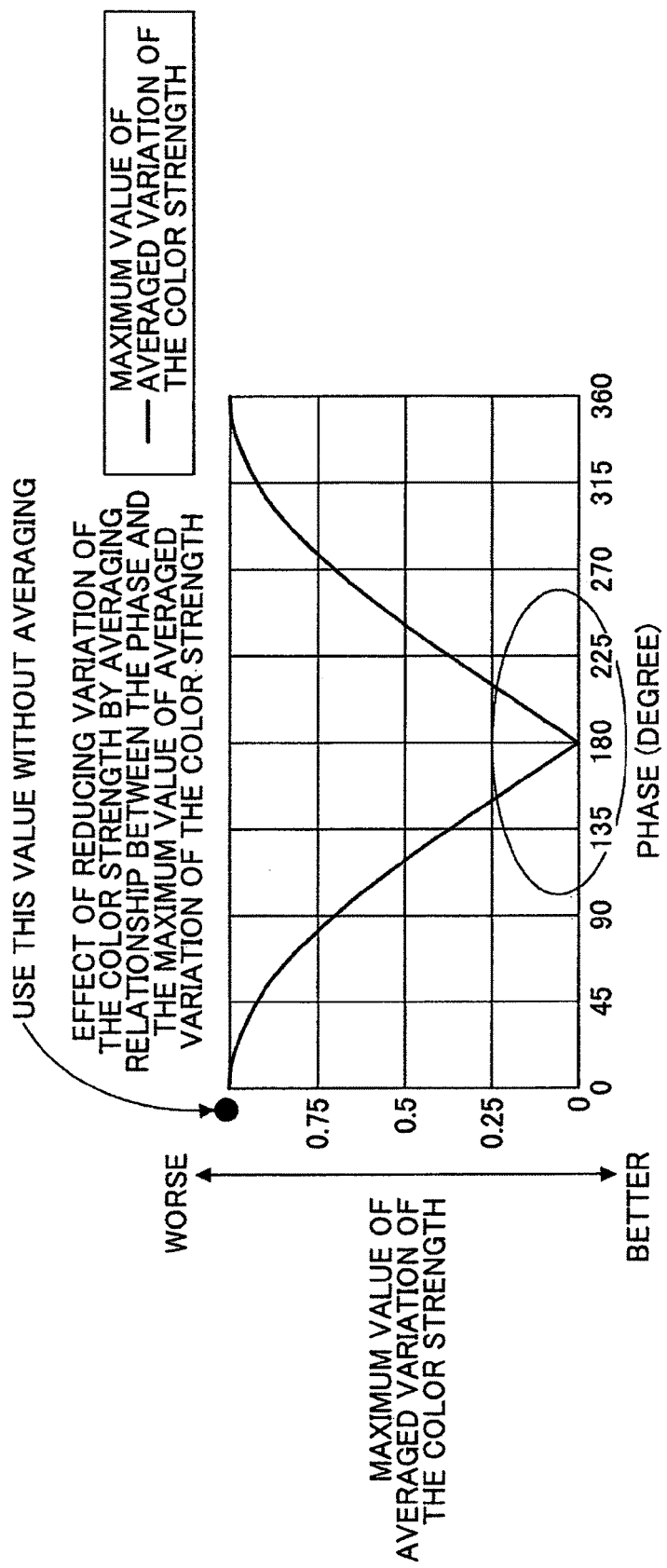

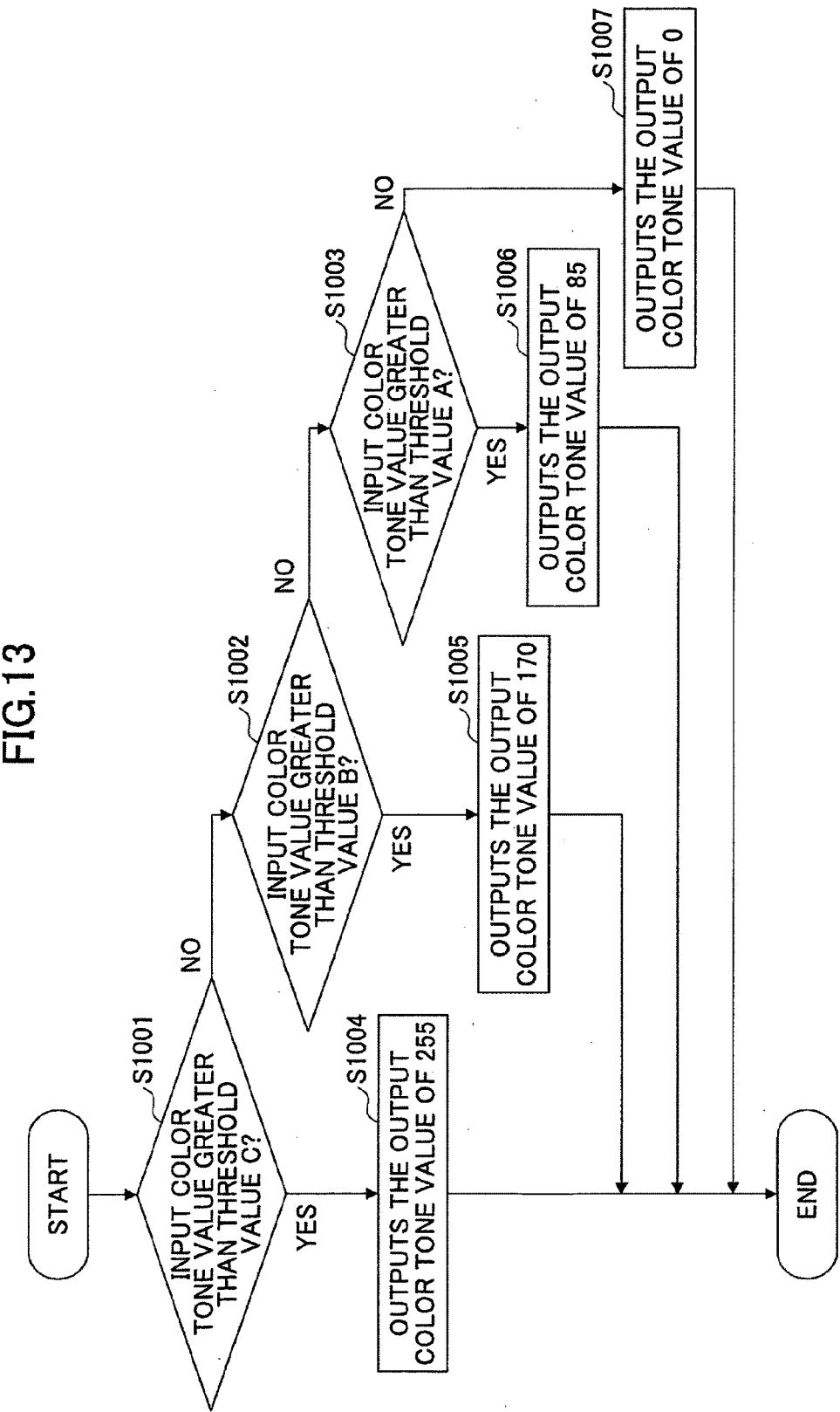

FIG.14A

| y\x | 0 | 1 | 2 | 3 | 4 | 5 | 6 | 7 | 8 | 9 | 10 | 11 |
|---|---|---|---|---|---|---|---|---|---|---|---|---|
| 0 | 28 | 71 | 156 | 188 | 202 | 115 | 30 | 72 | 157 | 187 | 201 | 113 |
| 1 | 170 | 212 | 131 | 46 | 61 | 146 | 172 | 214 | 130 | 45 | 59 | 144 |
| 2 | 244 | 231 | 89 | 4 | 18 | 103 | 245 | 229 | 88 | 3 | 17 | 102 |
| 3 | 185 | 199 | 117 | 32 | 75 | 160 | 185 | 199 | 116 | 31 | 74 | 159 |
| 4 | 43 | 58 | 143 | 174 | 216 | 128 | 43 | 57 | 142 | 173 | 215 | 128 |
| 5 | 1 | 15 | 100 | 242 | 227 | 85 | 0 | 15 | 100 | 241 | 228 | 86 |
| 6 | 29 | 72 | 157 | 186 | 200 | 114 | 29 | 71 | 156 | 188 | 202 | 114 |
| 7 | 171 | 213 | 130 | 45 | 59 | 144 | 170 | 213 | 131 | 46 | 60 | 145 |
| 8 | 244 | 229 | 87 | 2 | 16 | 101 | 243 | 230 | 88 | 3 | 18 | 103 |
| 9 | 184 | 198 | 115 | 30 | 73 | 158 | 186 | 200 | 117 | 32 | 74 | 159 |
| 10 | 42 | 56 | 141 | 172 | 215 | 129 | 44 | 58 | 143 | 173 | 216 | 127 |
| 11 | 0 | 14 | 99 | 241 | 228 | 87 | 2 | 16 | 101 | 242 | 226 | 85 |

FIG.14B

| y\x | 0 | 1 | 2 | 3 | 4 | 5 | 6 | 7 | 8 | 9 | 10 | 11 |
|---|---|---|---|---|---|---|---|---|---|---|---|---|
| 0 | 33 | 75 | 160 | 193 | 207 | 120 | 35 | 77 | 162 | 192 | 206 | 118 |
| 1 | 175 | 217 | 136 | 51 | 65 | 150 | 176 | 219 | 135 | 50 | 64 | 149 |
| 2 | 248 | 235 | 94 | 9 | 23 | 108 | 249 | 234 | 92 | 7 | 22 | 107 |
| 3 | 190 | 204 | 122 | 37 | 79 | 164 | 189 | 203 | 121 | 36 | 78 | 163 |
| 4 | 48 | 62 | 147 | 179 | 221 | 133 | 48 | 62 | 147 | 177 | 220 | 133 |
| 5 | 6 | 20 | 105 | 247 | 232 | 90 | 5 | 19 | 104 | 246 | 232 | 91 |
| 6 | 34 | 77 | 162 | 191 | 205 | 118 | 33 | 76 | 161 | 192 | 206 | 119 |
| 7 | 176 | 218 | 134 | 49 | 64 | 149 | 175 | 218 | 136 | 51 | 65 | 150 |
| 8 | 249 | 234 | 92 | 7 | 21 | 106 | 248 | 235 | 93 | 8 | 22 | 107 |
| 9 | 189 | 203 | 120 | 35 | 78 | 163 | 190 | 205 | 121 | 36 | 79 | 164 |
| 10 | 47 | 61 | 146 | 177 | 219 | 134 | 49 | 63 | 148 | 178 | 221 | 132 |
| 11 | 5 | 19 | 104 | 245 | 233 | 91 | 6 | 20 | 105 | 247 | 231 | 90 |

| y\x | 0 | 1 | 2 | 3 | 4 | 5 | 6 | 7 | 8 | 9 | 10 | 11 |
|---|---|---|---|---|---|---|---|---|---|---|---|---|
| 0 | 38 | 80 | 165 | 198 | 212 | 124 | 39 | 82 | 167 | 196 | 211 | 123 |
| 1 | 179 | 222 | 141 | 56 | 70 | 155 | 181 | 224 | 140 | 55 | 69 | 154 |
| 2 | 253 | 240 | 98 | 13 | 28 | 113 | 254 | 239 | 97 | 12 | 26 | 111 |
| 3 | 195 | 209 | 127 | 42 | 84 | 169 | 194 | 208 | 126 | 41 | 83 | 168 |
| 4 | 53 | 67 | 152 | 183 | 226 | 137 | 52 | 66 | 151 | 182 | 225 | 138 |
| 5 | 10 | 25 | 110 | 251 | 236 | 95 | 10 | 24 | 109 | 251 | 237 | 95 |
| 6 | 39 | 81 | 166 | 196 | 210 | 123 | 38 | 81 | 166 | 197 | 211 | 124 |
| 7 | 180 | 223 | 139 | 54 | 68 | 153 | 180 | 222 | 140 | 55 | 69 | 154 |
| 8 | 254 | 238 | 97 | 12 | 26 | 111 | 252 | 239 | 98 | 13 | 27 | 112 |
| 9 | 193 | 208 | 125 | 40 | 82 | 167 | 195 | 209 | 126 | 41 | 84 | 169 |
| 10 | 52 | 66 | 151 | 182 | 224 | 139 | 54 | 68 | 153 | 183 | 225 | 137 |
| 11 | 9 | 23 | 108 | 250 | 238 | 96 | 11 | 25 | 110 | 252 | 236 | 94 |

| y\x | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 64 | 159 | 105 | 137 | 68 | 164 | 103 | 135 | 64 | 160 | 105 | 137 | 68 | 163 | 102 | 134 |
| 1 | 230 | 201 | 10 | 42 | 233 | 198 | 7 | 39 | 230 | 200 | 9 | 41 | 232 | 198 | 6 | 38 |
| 2 | 99 | 131 | 74 | 169 | 97 | 129 | 71 | 167 | 98 | 130 | 73 | 169 | 97 | 129 | 70 | 166 |
| 3 | 3 | 35 | 226 | 193 | 2 | 34 | 225 | 194 | 2 | 34 | 226 | 192 | 1 | 33 | 224 | 194 |
| 4 | 67 | 163 | 101 | 133 | 66 | 161 | 103 | 135 | 66 | 162 | 101 | 133 | 65 | 161 | 104 | 136 |
| 5 | 232 | 197 | 6 | 38 | 229 | 199 | 8 | 40 | 231 | 196 | 5 | 37 | 228 | 200 | 8 | 40 |
| 6 | 96 | 128 | 70 | 165 | 99 | 131 | 72 | 167 | 95 | 127 | 69 | 165 | 100 | 132 | 72 | 168 |
| 7 | 0 | 32 | 224 | 195 | 4 | 36 | 227 | 191 | 0 | 32 | 223 | 196 | 4 | 36 | 228 | 192 |
| 8 | 64 | 160 | 105 | 137 | 68 | 163 | 102 | 134 | 64 | 159 | 105 | 137 | 68 | 164 | 103 | 135 |
| 9 | 230 | 200 | 9 | 41 | 232 | 198 | 6 | 38 | 230 | 201 | 10 | 42 | 233 | 198 | 7 | 39 |
| 10 | 98 | 130 | 73 | 169 | 97 | 129 | 70 | 166 | 99 | 131 | 74 | 169 | 97 | 129 | 71 | 167 |
| 11 | 2 | 34 | 226 | 192 | 1 | 33 | 224 | 194 | 3 | 35 | 226 | 193 | 2 | 34 | 225 | 194 |
| 12 | 66 | 162 | 101 | 133 | 65 | 161 | 104 | 136 | 67 | 163 | 101 | 133 | 66 | 161 | 103 | 135 |
| 13 | 231 | 196 | 5 | 37 | 228 | 200 | 8 | 40 | 232 | 197 | 6 | 38 | 229 | 199 | 8 | 40 |
| 14 | 95 | 127 | 69 | 165 | 100 | 132 | 72 | 168 | 96 | 128 | 70 | 165 | 99 | 131 | 72 | 167 |
| 15 | 0 | 32 | 223 | 196 | 4 | 36 | 228 | 192 | 0 | 32 | 224 | 195 | 4 | 36 | 227 | 191 |

FIG.15B

| y\x | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 74 | 170 | 116 | 148 | 79 | 174 | 113 | 145 | 75 | 170 | 115 | 147 | 78 | 174 | 113 | 145 |
| 1 | 240 | 212 | 20 | 52 | 244 | 209 | 18 | 50 | 241 | 211 | 20 | 52 | 243 | 208 | 17 | 49 |
| 2 | 109 | 141 | 84 | 180 | 108 | 140 | 82 | 177 | 109 | 141 | 84 | 179 | 107 | 139 | 81 | 176 |
| 3 | 14 | 46 | 237 | 204 | 12 | 44 | 236 | 204 | 13 | 45 | 236 | 203 | 12 | 44 | 235 | 205 |
| 4 | 78 | 173 | 112 | 144 | 76 | 172 | 114 | 146 | 77 | 172 | 111 | 143 | 76 | 171 | 115 | 147 |
| 5 | 242 | 208 | 16 | 48 | 240 | 210 | 18 | 50 | 242 | 207 | 16 | 48 | 239 | 210 | 19 | 51 |
| 6 | 107 | 139 | 80 | 176 | 110 | 142 | 82 | 178 | 106 | 138 | 80 | 175 | 111 | 143 | 83 | 178 |
| 7 | 11 | 43 | 234 | 206 | 14 | 46 | 238 | 202 | 10 | 42 | 234 | 206 | 15 | 47 | 238 | 202 |
| 8 | 75 | 170 | 115 | 147 | 78 | 174 | 113 | 145 | 74 | 170 | 116 | 148 | 79 | 174 | 113 | 145 |
| 9 | 241 | 211 | 20 | 52 | 243 | 208 | 17 | 49 | 240 | 212 | 20 | 52 | 244 | 209 | 18 | 50 |
| 10 | 109 | 141 | 84 | 179 | 107 | 139 | 81 | 176 | 109 | 141 | 84 | 180 | 108 | 140 | 82 | 177 |
| 11 | 13 | 45 | 236 | 203 | 12 | 44 | 235 | 205 | 14 | 46 | 237 | 204 | 12 | 44 | 236 | 204 |
| 12 | 77 | 172 | 111 | 143 | 76 | 171 | 115 | 147 | 78 | 173 | 112 | 144 | 76 | 172 | 114 | 146 |
| 13 | 242 | 207 | 16 | 48 | 239 | 210 | 19 | 51 | 242 | 208 | 16 | 48 | 240 | 210 | 18 | 50 |
| 14 | 106 | 138 | 80 | 175 | 111 | 143 | 83 | 178 | 107 | 139 | 80 | 176 | 110 | 142 | 82 | 178 |
| 15 | 10 | 42 | 234 | 206 | 15 | 47 | 238 | 202 | 11 | 43 | 234 | 206 | 14 | 46 | 238 | 202 |

| y\x | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 85 | 180 | 127 | 159 | 89 | 185 | 124 | 156 | 85 | 181 | 126 | 158 | 89 | 184 | 123 | 155 |
| 1 | 251 | 222 | 31 | 63 | 254 | 220 | 28 | 60 | 252 | 222 | 30 | 62 | 254 | 219 | 28 | 60 |
| 2 | 120 | 152 | 95 | 190 | 119 | 151 | 92 | 188 | 119 | 151 | 94 | 190 | 118 | 150 | 91 | 187 |
| 3 | 24 | 56 | 248 | 214 | 23 | 55 | 246 | 215 | 24 | 56 | 247 | 214 | 22 | 54 | 246 | 216 |
| 4 | 88 | 184 | 123 | 155 | 87 | 182 | 125 | 157 | 87 | 183 | 122 | 154 | 86 | 182 | 125 | 157 |
| 5 | 253 | 218 | 27 | 59 | 250 | 220 | 29 | 61 | 252 | 218 | 26 | 58 | 250 | 221 | 30 | 62 |
| 6 | 117 | 149 | 91 | 186 | 121 | 153 | 93 | 188 | 117 | 149 | 90 | 186 | 121 | 153 | 93 | 189 |
| 7 | 22 | 54 | 245 | 216 | 25 | 57 | 248 | 212 | 21 | 53 | 244 | 217 | 26 | 58 | 249 | 213 |
| 8 | 85 | 181 | 126 | 158 | 89 | 184 | 123 | 155 | 85 | 180 | 127 | 159 | 89 | 185 | 124 | 156 |
| 9 | 252 | 222 | 30 | 62 | 254 | 219 | 28 | 60 | 251 | 222 | 31 | 63 | 254 | 220 | 28 | 60 |
| 10 | 119 | 151 | 94 | 190 | 118 | 150 | 91 | 187 | 120 | 152 | 95 | 190 | 119 | 151 | 92 | 188 |
| 11 | 24 | 56 | 247 | 214 | 22 | 54 | 246 | 216 | 24 | 56 | 248 | 214 | 23 | 55 | 246 | 215 |
| 12 | 87 | 183 | 122 | 154 | 86 | 182 | 125 | 157 | 88 | 184 | 123 | 155 | 87 | 182 | 125 | 157 |
| 13 | 252 | 218 | 26 | 58 | 250 | 221 | 30 | 62 | 253 | 218 | 27 | 59 | 250 | 220 | 29 | 61 |
| 14 | 117 | 149 | 90 | 186 | 121 | 153 | 93 | 189 | 117 | 149 | 91 | 186 | 121 | 153 | 93 | 188 |
| 15 | 21 | 53 | 244 | 217 | 26 | 58 | 249 | 213 | 22 | 54 | 245 | 216 | 25 | 57 | 248 | 212 |

603

| PATCH | COLOR TONE VALUE | SCANNED VALUE |
|---|---|---|
| K00 | 0 | 250 |
| K01 | 16 | 207 |
| K02 | 32 | 191 |
| K03 | 48 | 166 |
| K04 | 64 | 141 |
| K05 | 80 | 109 |
| K06 | 96 | 100 |
| K07 | 112 | 88 |
| K08 | 128 | 75 |
| K09 | 143 | 64 |
| K10 | 159 | 51 |
| K11 | 175 | 45 |
| K12 | 191 | 32 |
| K13 | 207 | 29 |
| K14 | 223 | 24 |
| K15 | 239 | 21 |
| K16 | 255 | 20 |

FIG.18

| COLOR TONE VALUE | EXPECTED VALUE |
|---|---|
| 0 | 250 |
| 17 | 225 |
| 34 | 200 |
| 51 | 175 |
| 68 | 150 |
| 85 | 130 |
| 102 | 110 |
| 119 | 90 |
| 136 | 75 |
| 153 | 60 |
| 170 | 50 |
| 187 | 42 |
| 204 | 35 |
| 221 | 30 |
| 238 | 24 |
| 255 | 20 |

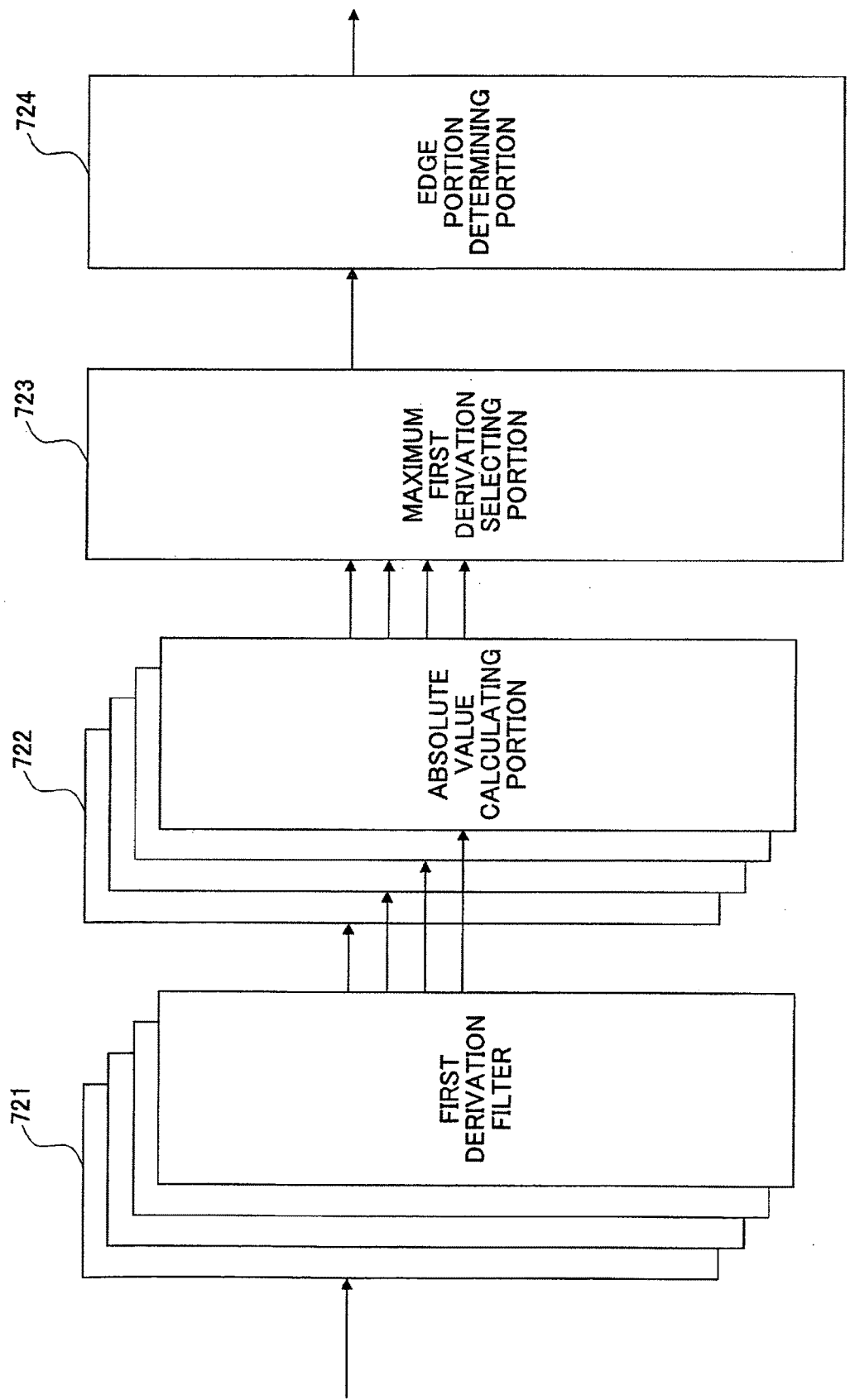

FIG.26A

| 1 | 1 | 1 | 1 | 1 |
|---|---|---|---|---|
| 1 | 1 | 1 | 1 | 1 |
| 0 | 0 | 0 | 0 | 0 |
| -1 | -1 | -1 | -1 | -1 |
| -1 | -1 | -1 | -1 | -1 |

FIG.26B

| -1 | -1 | 0 | 1 | 1 |
|---|---|---|---|---|
| -1 | -1 | 0 | 1 | 1 |
| -1 | -1 | 0 | 1 | 1 |
| -1 | -1 | 0 | 1 | 1 |
| -1 | -1 | 0 | 1 | 1 |

FIG.26C

| 0 | 1 | 1 | 1 | 1 |
|---|---|---|---|---|
| -1 | 0 | 1 | 1 | 1 |
| -1 | -1 | 0 | 1 | 1 |
| -1 | -1 | -1 | 0 | 1 |
| -1 | -1 | -1 | -1 | 0 |

FIG.26D

| 1 | 1 | 1 | 1 | 0 |
|---|---|---|---|---|
| 1 | 1 | 1 | 0 | -1 |
| 1 | 1 | 0 | -1 | -1 |
| 1 | 0 | -1 | -1 | -1 |
| 0 | -1 | -1 | -1 | -1 |

IMAGE PROCESSING APPARATUS, IMAGE PROCESSING METHOD, AND COMPUTER-READABLE RECORDING MEDIUM STORING IMAGE PROCESSING PROGRAM FOR GENERATING COLOR TONE CORRECTION PARAMETER

BACKGROUND OF THE INVENTION

1. Field of the Invention

The present invention generally relates to image processing apparatus, image processing method, and computer-readable recording medium storing image processing program for generating color tone correction parameter, and more particularly to the image processing apparatus, the image processing method, and the computer-readable recording medium storing image processing program for generating color tone correction parameter which are used for correcting color tone value of an image data, wherein patches of the same color, which indicate gradual changes of color tones of an uniform color, are arranged in a predetermined direction.

2. Description of the Related Art

Since a temporal change is occurred in a component or an assembled portion of the component of an image forming portion, the same print may not be obtained from the same image forming apparatus by using the same image data after a certain period of time. For example, two prints obtained from the same image data may be different from each other in a manner that color strength of the two prints differ from each other. An image forming apparatus, for example disclosed in patent document 1, has been proposed which scans a patch which constitutes an image data for correcting the color strength and is printed on a sheet, and executes a process for generating a color tone correction parameter based on the patch, in order to correct the different color strength. The image forming apparatus, disclosed in patent document 1, generates a color tone correction parameter based on four patches, each of which including a plurality of color tones and corresponding to each toner color of C, M, Y and K, and based on a patch formed by stacking three toner colors C, M and Y, in order to correct a specific characteristics of each toner.

The image forming apparatus may print a sheet with nonuniformity of color strength even if an image data, used for printing the sheet, includes uniform color strength for all of the pixels. In a xerographic image forming apparatus, the nonuniformity of color strength may be caused by assembling accuracy or quality of components such as, for example, eccentricity of a photo conductor and a transfer roller, variability of a distance between the photo conductor and a developer sleeve in the direction of rotational direction of the photo conductor.

An image forming apparatus, for example disclosed in patent documents 2 and 3, generates a color tone correction parameter used for reducing the nonuniformity of color strength in the direction of rotational axis of the photo conductor or the like (hereinafter referred to simply as a "main scanning direction"), or in the rotational direction of the photo conductor (hereinafter referred to simply as a "sub-scanning direction"), and for correcting the temporal change of the component or the like.

The image forming apparatus, disclosed in patent document 2, generates color tone correction parameter for reducing the nonuniformity of color strength in the main scanning direction, and for correcting the temporal change of the component or the like by measuring the color strength of patches of the same color and the same color tone which are disposed on the surface of the photo conductor, and each of which is disposed in a different position in the main scanning direction.

As disclosed in patent document 2, the image forming apparatus reduces the nonuniformity of color strength in the main scanning direction by averaging procedure of color strength of the patches of the same color and the same color tone. However, as will be apparent below, two patches of the same color and the same color tone is not always enough to reduce the nonuniformity of color strength.

As disclosed in patent document 3, the image forming apparatus further generates color tone correction parameter for reducing the nonuniformity of color strength and for correcting the temporal change of the component or the like in the sub-scanning direction by using patches, each of which are disposed in a different position in the sub-scanning direction.

Since the image forming apparatus disclosed in patent document 3 uses the patches of the same color and different color tone, each of which are disposed in a different position in the sub-scanning direction, an irrelevance color tone correction parameter which are caused by nonuniformity of color strength in the sub-scanning direction may be generated. As will be apparent below, a color tone image data for figuring out a temporal change of the color strength is printed by distorted color tone characteristics which are caused by color strength in the sub-scanning direction.

A printed sheet, printed by utilizing a color tone correction parameter based on the distorted color tone characteristics, is recognized as a sheet which includes the distorted color tone characteristics such as the color tone skip.

The image forming apparatus disclosed in patent document 3 generates the color tone correction parameter in an image forming apparatus. The image forming apparatus disclosed in patent document 3 includes two sensors which are arranged in the main scanning direction. Thus, it is not easy to retain space for the sensors, because space in the image forming apparatus is limited. Further, it is not easy to arrange a number of sensors in order to sense color tone values of the patches of the same color arranged in the main scanning direction. Thus, it is not easy to generate the color tone correction parameter based on the color values sensed by the number of sensors.

[Patent Document 1] Japanese Patent No. 3241986

[Patent Document 2] Japanese Patent Laid-Open Publication No. 2007-264371

[Patent Document 3] Japanese Patent Laid-Open Publication No. 2007-264364

SUMMARY OF THE INVENTION

It is a general object of the present invention to provide a computer program product, information processing apparatus, method, and computer-readable storage medium for generating color tone correction parameter which is used for reducing the nonuniformity of color strength in the sub-scanning direction, and for correcting the temporal change of the color strength without causing a defect such as color strength skip.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by an image processing apparatus, an image processing method, and a computer-readable recording medium storing image processing program for generating color tone correction parameter particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides an image processing apparatus for causing a printing portion to print photoconductive image data, wherein the printing portion prints the photoconductive image data, based on color tone image data, on a sheet by forming the photoconductive image data in a main scanning direction of a photoconductor while rotating the photoconductor in a sub-scanning direction; including: a color tone image data storing medium for storing the color tone image data configured to include a plurality of color tone values of single color, wherein the plurality of color tone values are different from each other and are arranged in a sequential order; a printing procedure request portion configured to request printing of the color tone image data in a state where a patch row, represented by the plurality of color tone values of the color tone image data, is arranged in a direction almost parallel with the main scanning direction, to the printing portion;

an image data obtaining portion configured to obtain scanned color tone data, showing scanned value of the patch row, from a scanning portion configured to optically scan the patch row printed on the sheet; and a parameter generating portion configured to generate a color tone correction parameter for correcting color tone value of the photoconductive image data by comparing the scanned color tone data and the color tone image data.

Another embodiment of the present invention provides an image processing method in an image processing apparatus which causes a printing portion to print photoconductive image data, wherein the printing portion prints the photoconductive image data, based on color tone image data, on a sheet by forming the photoconductive image data in a main scanning direction of a photoconductor while rotating the photoconductor in a sub-scanning direction; wherein the image processing apparatus includes a color tone image data storing medium for storing the color tone image data configured to include a plurality of color tone values of single color, wherein the plurality of color tone values are different from each other and are arranged in a sequential order; and the image processing method includes the steps of; requesting printing of the color tone image data in a state where a patch row, represented by the plurality of color tone values of the color tone image data, is arranged in a direction almost parallel with the main scanning direction, to the printing portion; obtaining scanned color tone data, showing scanned value of the patch row, from a scanning portion configured to optically scan the patch row printed on the sheet; and generating a color tone correction parameter for correcting color tone value of the photoconductive image data by comparing the scanned color tone data and the color tone image data.

Other objects, features and advantages of the present invention will become more apparent from the following detailed description when read in conjunction with the accompanying drawings.

BRIEF DESCRIPTION OF THE DRAWINGS

FIG. 3A is a schematic drawing showing an exemplary block diagram of the image processing system for generating a color tone correction parameter according to embodiment 1;

FIG. 4 is a schematic drawing showing a frame format of a patch data;

FIG. 5 shows an exemplary schematic drawing of the color tone values associated with patch number;

FIG. 8 shows a schematic drawing of measured characteristics of color values of patches printed on a sheet;

FIG. 11C shows exemplary relationship between phase difference of the two patch rows and the maximum value of averaged variation of the color strength;

FIG. 13 shows flowchart of the middle tone process;

FIG. 14A shows a schematic drawing of an exemplary table of threshold values A used in a low number scanning lines screening process;

FIG. 14B shows a schematic drawing of an exemplary table of threshold values B used in a low number scanning lines screening process;

FIG. 14C shows a schematic drawing of an exemplary table of threshold values C used in a low number scanning lines screening process;

FIG. 15A shows a schematic drawing of an exemplary matrix of threshold values A used in a high number scanning lines screening process;

FIG. 15B shows a schematic drawing of an exemplary matrix of threshold values B used in a high number scanning lines screening process;

FIG. 15C shows a schematic drawing of an exemplary matrix of threshold values C used in a high number scanning lines screening process;

FIG. 18 shows a table showing relationship between the color tone values and the expected values of the measured values;

FIG. 25 shows a schematic drawing of functional block diagram of an edge detecting portion;

FIG. 26A shows gradient of pixel value in lateral direction;

FIG. 26B shows gradient of pixel value in vertical direction;

FIG. 26C shows gradient of pixel value in transverse direction; and

FIG. 26D shows gradient of pixel value in another transverse direction.

DESCRIPTION OF THE PREFERRED EMBODIMENTS

In the following, embodiments of the present invention will be described with reference to the accompanying drawings.

Figure 1:
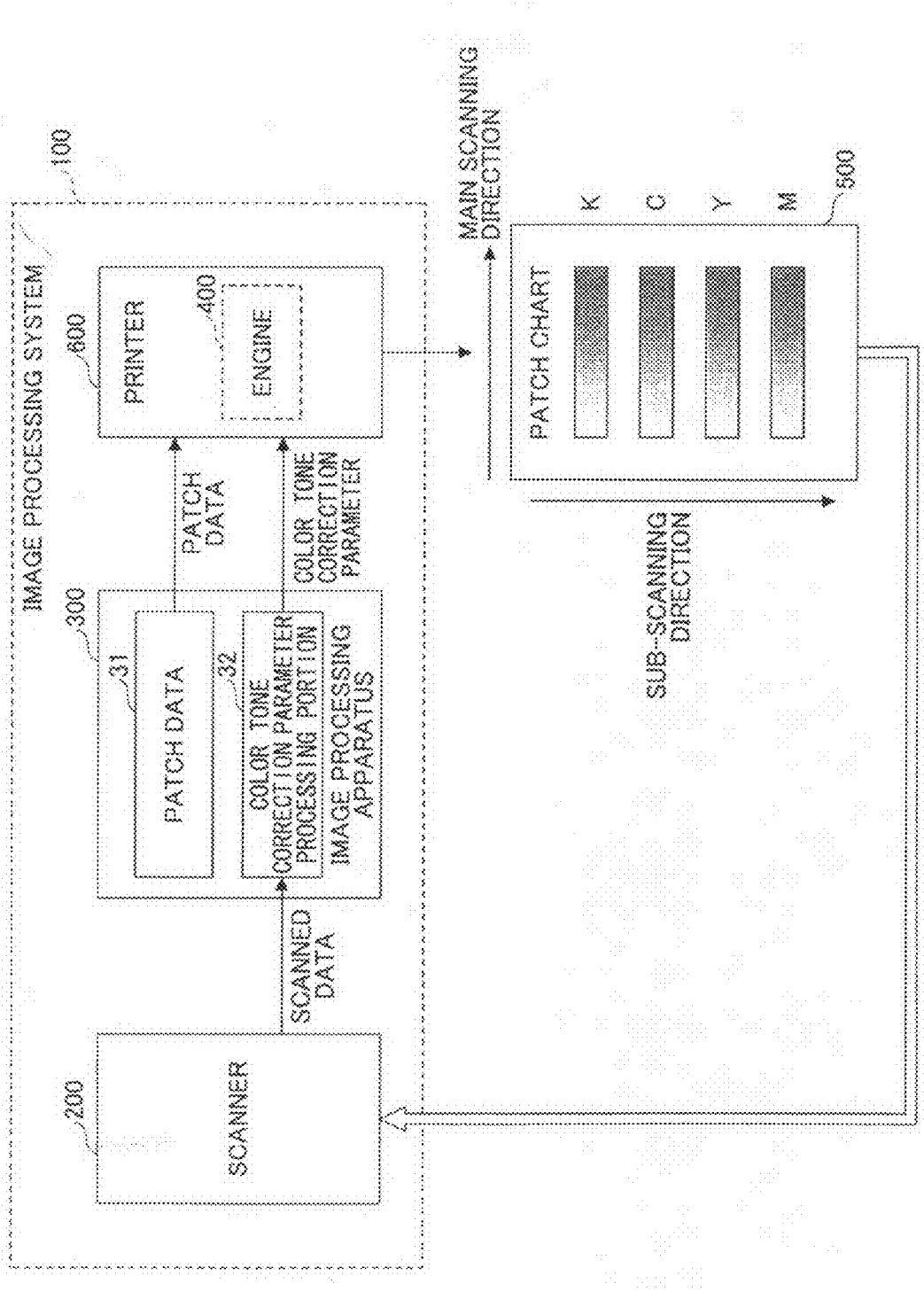
FIG. 1 is a schematic drawing showing an image processing system and an exemplary color tone correction performed by the image processing system.

FIG. 1 is a schematic drawing showing an image processing system 100 and an exemplary color tone correction performed by the image processing system 100.

The image processing system 100 includes a scanner 200, an image processing apparatus 300 and a printer 600. The printer 600 includes an engine 400. The image processing system 100 may be constituted of an MFP (Multi Function Peripheral) which is formed by incorporating the scanner 200, the image processing apparatus 300 and the printer 600 in one enclosure. In either cases, a color tone correction parameter processing portion 32 of the image processing apparatus 300 is realized by, for example, a computer which executes a program.

Patch data 31 constitutes an image data which is used for printing a patch chart 500. When a user switches mode of the image processing system 100 from a printing mode, in which the image processing system 100 prints out data such as a word processing document data or the like, to a color tone correction mode, the image processing apparatus 300 transmits the patch data 31 to the engine 400. Then the printer 600 executes printing process in order to print the patch chart 500 on a sheet based on the patch data 31.

The patch data 31 includes toner concentration values (hereinafter referred to as "color tone value(s)") for each toner color of C, M, Y and M, and each of toner concentration values includes color tones. For example, the patch data 31 includes seventeen patches of different color tone values of 0, 16, 32, 48, 64, 80, 96, 112, 128, 143, 159, 175, 191, 207, 223, 239 and 255, for each toner color. According to the present embodiment, patches, which include the different color tone values, for each single color are disposed in the main scanning direction. The color tone values of the patches for each single color are different from each other and are arranged in a sequential order in the direction of the main scanning direction. Hereinafter, the direction of a rotational axis of a photoconductor drum is referred to as the main scanning direction constitutes, and the rotational direction of the photoconductor drum is referred to as the sub-scanning direction constitutes.

The image processing apparatus 300 performs middle tone process such as a dither method on the patch data 31, and outputs the patch chart 500 printed on the sheet. In general, color strength of the patch chart 500 may be different from the one printed after a certain period of time, because of a temporal change in a component or an assembled portion of the image processing apparatus 300.

The scanner 200 scans the patch chart 500 and outputs scanned data, and then the color tone correction parameter processing portion 32 generates a color tone correction parameter so that the scanned data corresponds with the patch data 31.

A printed result of the printer 600 includes a positional nonuniformity of color strength even if the color tone values, used for printing, include uniform color strength for all of the pixels. The positional nonuniformity of color strength is caused by an eccentricity of the photoconductor drum and a transfer roller, variability of a distance between the photo conductor and a developer sleeve in the direction of rotational direction of the photo conductor.

Herein, it has been experimentally-confirmed that the nonuniformity of color strength in the sub-scanning direction is greater than that of in the main scanning direction. Thus, single color patches, each of which includes a predetermined color tone according to predetermined consecutive color tone characteristics, are scanned to have distorted color tone characteristics, if the single patches are arranged in the sub-scanning direction. On the contrary, the image processing system 100 according to the present embodiment utilizes patch row which includes a plurality of patches, and the color tone values of the patches are different from each other and are arranged in a sequential order in the main scanning direction for each color. Thus, the distortion of the color tone characteristics is reduced. The image processing system 100 can reduce distortion of the color tone correction parameter, and provide greater correcting performance of the temporal changes. The image processing system 100 can reduce the nonuniformity of color strength in the sub-scanning direction by arranging the patches in the main scanning direction for each color.

<Hardware Block Diagram of an MFP>

Figure 2:
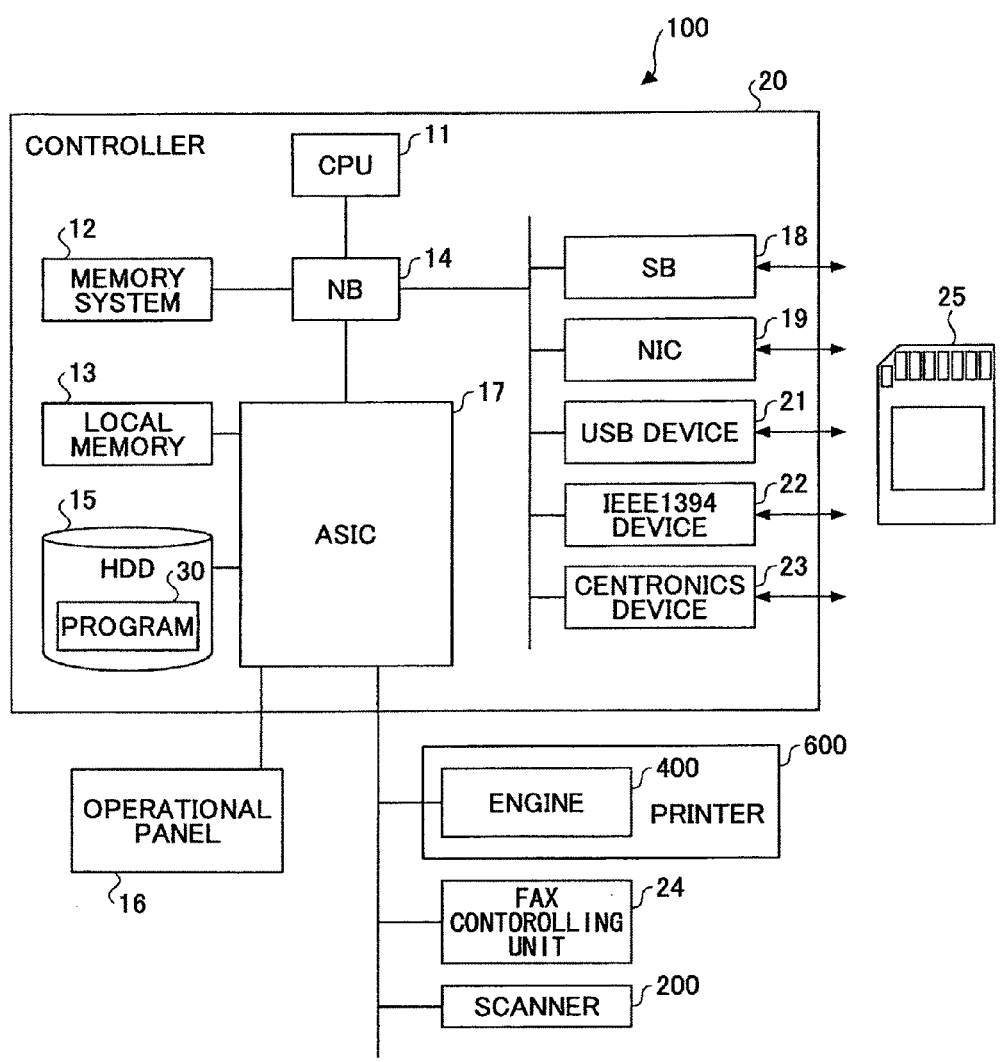
FIG. 2 is a schematic drawing showing a hardware block diagram of the image processing system implemented as an MFP.

FIG. 2 is a schematic drawing showing a hardware block diagram of the image processing system implemented as an MFP. The MFP includes a controller 20, an operation panel 16, a FAX control unit 24 and the printer 600. The controller 200 includes a CPU 11, a system memory 12, an NB (North Bridge) 14, an SB (South Bridge) 18, an ASIC 17, a local memory 13, a HDD (Hard Disk Drive) 15, an NIC (Network Interface Card) 19, a USB device 21, an IEEE1394 device 22 and a Centronics interface 23.

A storage medium 25 is detachably connected to the USB device 21, and a program 30 stored in the storage medium 25 is installed into the HDD 15. The program 30 may be stored in a server (not shown) and installed into the HDD15 via the NIC19.

The CPU 11 controls the whole portion of the MFP. For example, the CPU 11 causes an OS to execute a process. The NB 14 is a bridge. The SB 18 is a bridge for connecting a PCI bus, a ROM and peripheral devices or the like. The system memory 12 is used as, for example, an image memory of the MPF. The local memory 13 is used as a copy image buffer and a code buffer.

The ASIC 17 includes hardware components used for image processing, and constitutes an IC used for image processing. The HDD 15 constitutes a storage (an auxiliary storage device), and stores image data, document data, the program 30 and font data or the like. The NIC 19 constitutes an interface device which connects the MFP to the Internet. Each of the USB device 21, the IEEE1394 device and the Centronics interface 23 constitutes interface which is based on the respective standard.

The operation panel 16 constitutes an operation portion which accepts an input operation of an operator via a touch panel, and provides a graphical image to the operator. Physical keyboards are arranged around the operation panel 16. The printer 600 includes the engine 400 shown in FIG. 1 and, for example, a drum color plotter. The printer 600 forms an image which is corresponding to a page of a sheet, and transfers the image on the sheet based on a printing job data including the patch data 31 and based on an image data scanned by the scanner 200. The printer 600, for example, forms a toner image on a photoconductor drum of the drum color plotter, transfers the toner image to the sheet, and fixes the toner image by heat and pressure provided from a fixing apparatus. The printer 600 prints a patch 500 on the surface of the sheet.

The scanner 200 optically scans a document disposed on a contact glass, converts a signal obtained from a reflected light into a predetermined resolution digital data by processing image processes such as an error diffusion process and a gamma conversion process, and generates image data. The scanner 200 scans the patch chart 500 and generates the scanned data.

The fax controlling unit 24 connects to a public telecommunication network via an NCU (Network Control Unit), and controls transmitting and receiving processes of a facsimile requested by communication procedure using communication protocols of G3 or G4 facsimile standard, for example. The fax controlling unit 24 includes a memory and stores a facsimile data, which is received when the MFP is switched off, into the memory.

Embodiment 1

Figure 3B:
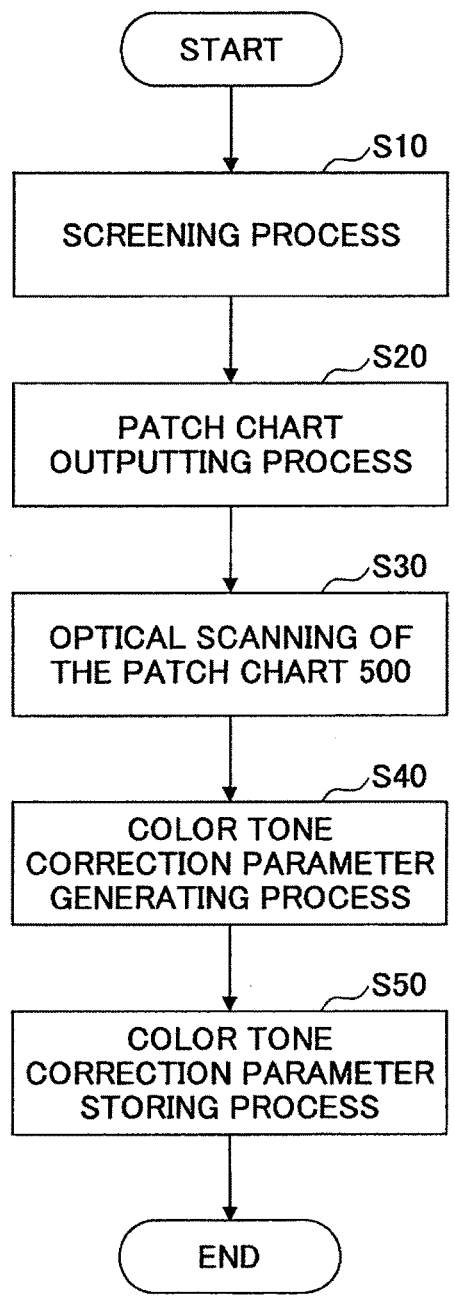
FIG. 3B shows a flowchart executed by the image processing system for generating the color tone correction parameter according to embodiment 1.

FIG. 3A is a schematic drawing showing an exemplary block diagram of the image processing system for generating the color tone correction parameter according to embodiment 1. FIG. 3B shows a flowchart executed by the image processing system 100 for generating color tone correction parameter according to embodiment 1.

The image processing system 100 includes a patch data storage 33, a patch chart output portion 34, a color tone correction parameter storage 36, a patch chart input portion 37, the color tone correction parameter processing portion 32 and a color tone correction parameter setting portion 35. The patch chart output portion 34, the patch chart input portion 37, the color tone correction parameter processing portion 32 and the color tone correction parameter setting portion 35 are realized by, for example, a computer which executes the program 30. A portion or the entire portion of the patch chart output portion 34, the patch chart input portion 37, the color tone correction parameter processing portion 32 and the color tone correction parameter setting portion 35 are realized in the form of logic circuits such as an ASIC. The patch data storage 33 and the color tone correction parameter storage 36 are realized in the form of the HDD 15 and a ROM, and store the patch data 31 and the color tone correction parameter, respectively. Herein, the color tone correction parameter is often held by the printer 600, thus the color tone correction parameter storage 36 may be included in the printer 600. In a case where a printer driver utilizes the color tone correction parameter, the printer driver may be included in an information processing apparatus such as a personal computer.

Hereinafter, the flowchart shown in FIG. 3B will be described. First of all, the patch data 31 and printing direction of the patch data 31 will be described.

<Patch Data>

FIG. 4 is a schematic drawing showing a frame format of the patch data 31. The patch data 31 is represented by the color tone value in FIG. 4. Herein, the patch chart 500 is a printed result of the patch data 31, thus the patch chart 500 contains the same color tone distribution as shown in FIG. 4. Hereinafter, the color tone value, which is corresponding to a pixel value of the image data, is described to have an integer value from 0 to 255. The larger the color tone value becomes, the larger the color strength becomes. On the contrary, as for the value of scanned data, the smaller the value of the scanned data becomes, the larger the color strength becomes.

The patch data 31 shown in FIG. 4 includes twelve patch rows 51. Herein, each patch row 51 includes a plurality of patches 52. Each patch 52 has single color tone value. The color tone values of the plurality of patches 52 are different from each other and are arranged in a sequential order, for example. Patch data 31 is printed on, for example, A4 size sheet. The twelve patch rows 51 are divided into two groups. The one group is a picture portion 210 and the other group is a character portion 220. Herein, a term "picture" represents mainly a photograph and a graphic or the like other than a character. The picture portion 210 includes a picture portion K201, a picture portion C202, a picture portion Y203, a picture portion M204, a picture portion K211, a picture portion C212, a picture portion Y213 and a picture portion M214. The character portion 220 includes a character portion K221, a character portion C222, a character portion Y223 and a character portion M224. The picture portions K201~M204 and K211~M214 and the character portions K221~M224 constitute the twelve patch rows 51. K represents for black, C represents for cyan, Y represents for yellow, M represents for magenta. Each of these four colors constitutes a single color of the image processing apparatus 300, and is represented by single color material. Although, only the single color patches 52 are shown in FIG. 4, the patch 52 may include multiple color tone values by stacking 3 colors (C, M and Y) patches.

The twelve patch rows 51 are divided into the picture portion 210 and the character portion 220, because the functions of the printer 600 required for printing pictures are different from those for printing characters. It is preferable for the pictures to be printed in a manner that the image data is more faithfully reflected to the pixel value than the characters. On the contrary, it is preferable for the characters to be printed in higher definition manner than the pictures. For the above reason, the picture portion 210 and the character portion 220 are subjected to the different middle tone processes. Since each middle tone process has different color tone characteristics, the patch data 31 includes the patch row 51 used as the picture portion 210 and the patch row 51 used as the character portion 220, respectively.

The picture portion 210 includes two patch rows 51 for respective colors (C, Y, M and K), because, in general, it is required for the pictures to be printed in a manner that the image data is more faithfully reflected to the pixel value than the characters. The picture portion K201 and the picture portion K211 are formed as the same patch row 51. The picture portion C202 and the picture portion C212 are formed as the same patch row 51. The picture portion Y203 and the picture portion Y213 are formed as the same patch row 51. The picture portion M204 and the picture portion M214 are formed as the same patch row 51.

Since the patch data 31 includes a plurality of patch rows 51 of the same color arranged in parallel and spaced apart in sub-scanning direction, and the image processing apparatus 300 performs averaging process using a plurality of patch rows 51 arranged in parallel and spaced apart in sub-scanning direction, it becomes possible to reduce a defect caused by the nonuniformity of color strength in the sub-scanning direction. The reason why the character portion 220 includes only one patch row 51 for each color is that the size of the sheet is limited and each patch 52 has a particular size. The character portion 220 may include two patch rows 51 for each color, and the picture portion 210 may include more than three patch rows 51 for each color.

The patch row 51 of the character portion K221 includes seventeen patches 52 shown as K00, K01, . . . and K16. The color tone value of the K00 patch 52 is zero (0), and the color tone value of K16 patch 52 is 255. The color tone values of K00-K16 patches 52 are increased almost equally from K00 to K16. Similarly, the patch rows 51 of the picture portions C202 and C212 include seventeen patches 51 shown as C00, C01, . . . and C16, respectively. The color tone value of the C00 patch 52 is zero (0), and the color tone value of C16 patch 52 is 255. The color tone values of C00-C16 patches 52 are increased almost equally from C00 to C16. The color tone values of K00-K16 patches 52 may not be increased almost equally from K00 to K16. Similarly, the color tone values of C00-C16 patches 52 may not be increased almost equally from C00 to C16. The color tone values of seventeen patches 52 in single patch row 51 may be arranged in a manner that the patch chart 500 includes uniform color value difference or uniform color strength difference between printed patches 52. Further, the color tone values of seventeen patches 52 in single patch row 51 may be arranged in monotonic increasing manner. Spaces between adjacent patch rows 51, for example a space between the picture portion K201 and C202, may not be necessary. Spaces between adjacent patches 52 may not be necessary.

FIG. 5 shows an exemplary schematic drawing of the color tone values associated with the patch number. The color tone values of the patches 52 of B00-B16 are shown in FIG. 5. As described above, the color tone values of K00-K16 patches 52 may not be increased almost equally from K00 to K16. The color tone values of the patches 52 in the character portion K221 may be the same with or may be different from the color values of the patches 52 in the picture portion K201 and/or K211. More specifically, for example, the color tone value of the K12 patch 52 in the character portion K221 may be the same with or may be different from the color value of the K12 patch 52 in the picture portion K201 and/or K211. The important thing is that the color tone values of the picture portions K201 and K211 are the same. More specifically, for example, the important thing is that the color tone value of the K12 patch in the picture portion K201 and the color tone value of the K12 patch in the picture portion K211 are the same.

The patch data 31 includes an explanatory text 231. The explanatory text 231 is a message which gives a user a correct orientation of the patch chart 500 on the contact glass of the scanner 200 when the patch chart 500 is going to be scanned by the scanner 200. The massage as shown in FIG. 4 says "Face down and Align the arrow printed on a sheet to the reference position (back left)".

The patch chart output portion 34 performs screening process to the patch data 31, and prints the patch chart 500 on a sheet. The screening process is a process in which the patch chart output portion 34 generates color tones by controlling number or density of color dots. The screening process is known as the dither method or the error diffusion method. The patch chart output portion 34 compares threshold values included in a matrix of threshold values and the color tone value, and generates a screened image which corresponds to the color tone values. The patch chart output portion 34 performs a low number scanning lines screening process for the patches 52 included in the picture portion 210 of the patch data 31. Under the low number scanning lines screening process, the patch chart output portion 34 forms screen with a low number. The patch chart output portion 34 performs a high number scanning lines screening process for the patches 52 included in the character portion 220 of the patch data 31. Under the high number scanning lines screening process, the patch chart output portion 34 forms screen with a high number. The patch chart output portion 34 outputs the patch chart 500 after processing the low number scanning lines screening process and the high number scanning lines screening process. The patch chart output portion 34 performs the high number scanning lines screening process for the message for the user. The patch chart 500 and the message are printed on a sheet.

The patch chart output portion 34 may utilize the error diffusion method for the characters. In this case, the patch chart output portion 34 performs the error diffusion process for the patches 52 included in the character portion 220. The important point is generating the color tone correction parameter based on the patch chart 500 which is obtained from the same process, i.e. the dither process or the error diffusion process, as the printing process.

The patch chart 500 shown in FIG. 4 is generated by representing the patch data 31. The patch chart 500 may be generated by processing the color tone correction process utilizing the color tone correction parameter which is generated in the previous color tone correction process. The patch chart 500 may be generated by either process described above as long as the color tone values utilized in the process is known value.

<Relationship between Printing Direction and the Patch Data 31>

Hereinafter, the relationship between the printing direction and the patch data 31 will be described. The patch chart output portion 34 generates the toner image based on the patch data 31 so that the patches 52 included in the character portion M224 are located at the forefront in the direction of rotational direction of a photoconductor drum 43, i.e. that the patch row 51 of the character portion M224 is located in parallel with a rotational axis 44 of the photoconductor drum 43.

Figure 6:
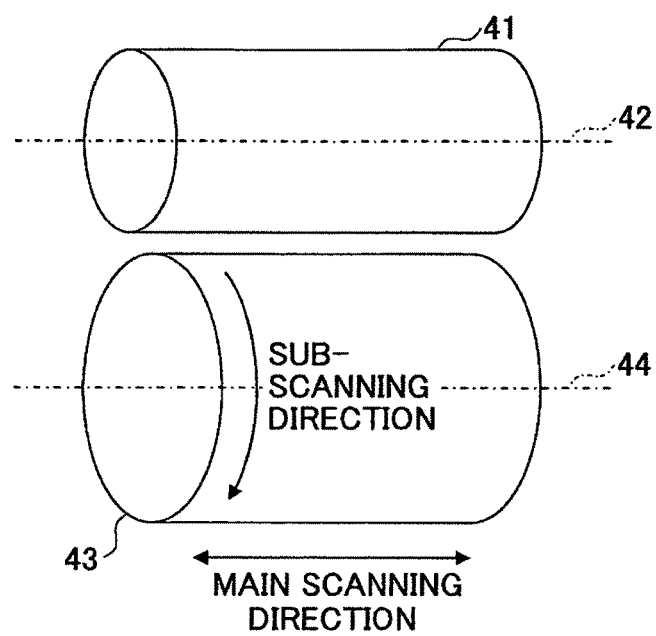
FIG. 6 shows a schematic drawing of an exemplary positional relationship of a photoconductor drum and a developer sleeve of the image processing system.

FIG. 6 shows a schematic drawing of an exemplary positional relationship of the photoconductor drum 43 and a developer sleeve 41 of the image processing system 100. The photoconductor drum 43 and the developer sleeve 41 are rotatably supported by axises 44 and 42, respectively. The photoconductor drum 43 and the developer sleeve 41 are disposed in a manner that a cylindrical surface of the photoconductor drum 43 and a cylindrical surface of the developer sleeve 41 are separated by a small distance. The photoconductor drum 43 and the developer sleeve 41 are disposed in parallel with each other.

Herein, a defect caused by the single color patch row 51 which is printed in the sub-scanning direction will be described with reference to FIG. 7A. In this case, the color tone values of the patch row 51 are different from each other and are arranged in a sequential order in the sub-scanning direction, and the patch data 31 includes the patch row 51 of black color (K). The patch chart output portion 34 outputs a laser beam based on the patch data 31, which contains half-tone dots and is generated by using the screening process, in order to form a latent image on the photoconductor drum 43. The laser on/off timing is determined by modulating the laser based on the patch data 31, after the printer 600 charges the cylindrical surface of the photoconductor drum 43. The latent image corresponding to the patch data 31 generated by using the screening process is formed on the cylindrical surface of the photoconductor drum 43 by irradiating the laser beam to the photoconductor drum 43. The developer sleeve 41 includes a developer case (not shown) which is located on the opposite side of the photoconductor drum 43. The developer (toner) is uniformly absorbed to the developer sleeve 41. Since a constant developer bias is applied to the developer sleeve 41, the toner image is formed on the photoconductor drum 43 by the toner which is absorbed to the photoconductor drum 43 in the same figure as an electrostatic image. The toner image is transferred on the surface of the sheet which is fed from a feeding tray, and is fixed thereto by heat and pressure.

However, in the case where the photoconductor drum 43 and/or the developer sleeve 41 include eccentricity, or where the photoconductor drum 43 and/or the developer sleeve 41 include strain, the distance between the photoconductor drum 43 and the developer sleeve 41 varies due to the rotation of the photoconductor drum 43 and the developer sleeve 41. Since the photoconductor drum 43 and the developer sleeve 41 are separated by a small distance, the variation of the distance therebetween may cause variation of the amount of the color material absorbed to the photoconductor drum 43. The variation of the amount of the color material may cause variation of the color tone in the direction of the rotational direction of the photoconductor drum 43.

FIG. 8 shows a schematic drawing of measured characteristics of color values of the patches 52 printed on a sheet, wherein the patch row 51 is printed on the sheet by a printer 600. Herein, the patch row 51 includes a plurality of the patches 52 of the same color tone. The lateral axis shows the sub-scanning direction of the photoconductor drum 43, the axis in depth direction shows the main scanning direction of the photoconductor drum 43, and the vertical axis shows the color value. The scale unit in the lateral axis is 1.7 centimeters. The scale unit in the axis in depth direction is 3.4 centimeters. FIG. 8 shows the variation of the color value in a sheet more or less than A4 size.

As shown in FIG. 8, variation of the color value in the sub-scanning direction is greater than variation of the color value in the main scanning direction. Hereinafter, unevenness of the color strength such as the variation of color value in the main scanning direction is called as mechanical unevenness of color strength. FIG. 8 shows that the variation of the color value in the sub-scanning direction is greater than the variation of the color value in the main scanning direction, according to the printer 600 which includes the photoconductor drum 43 and the developer sleeve 41. Although, FIG. 8 shows the characteristics of the variation of the color value, the variation of the color strength shows the same characteristics.

The patch chart 500 printed by the printer 600, having the color value characteristics shown in FIG. 8, includes the mechanical unevenness of color strength in addition to the temporal change.

Figure 7A:
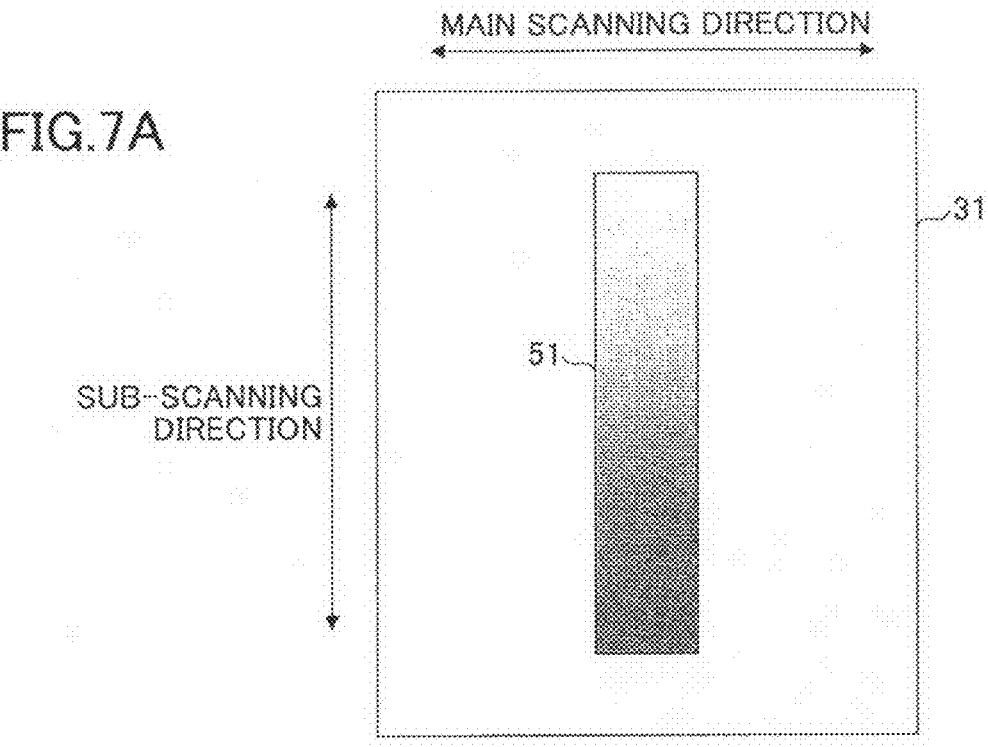
FIG. 7A shows a schematic drawing of a single color patch row printed on a sheet, wherein the color tone values of single color patches are different from each other and are arranged in a sequential order in a sub-scanning direction of the photoconductive drum.
Figure 9:
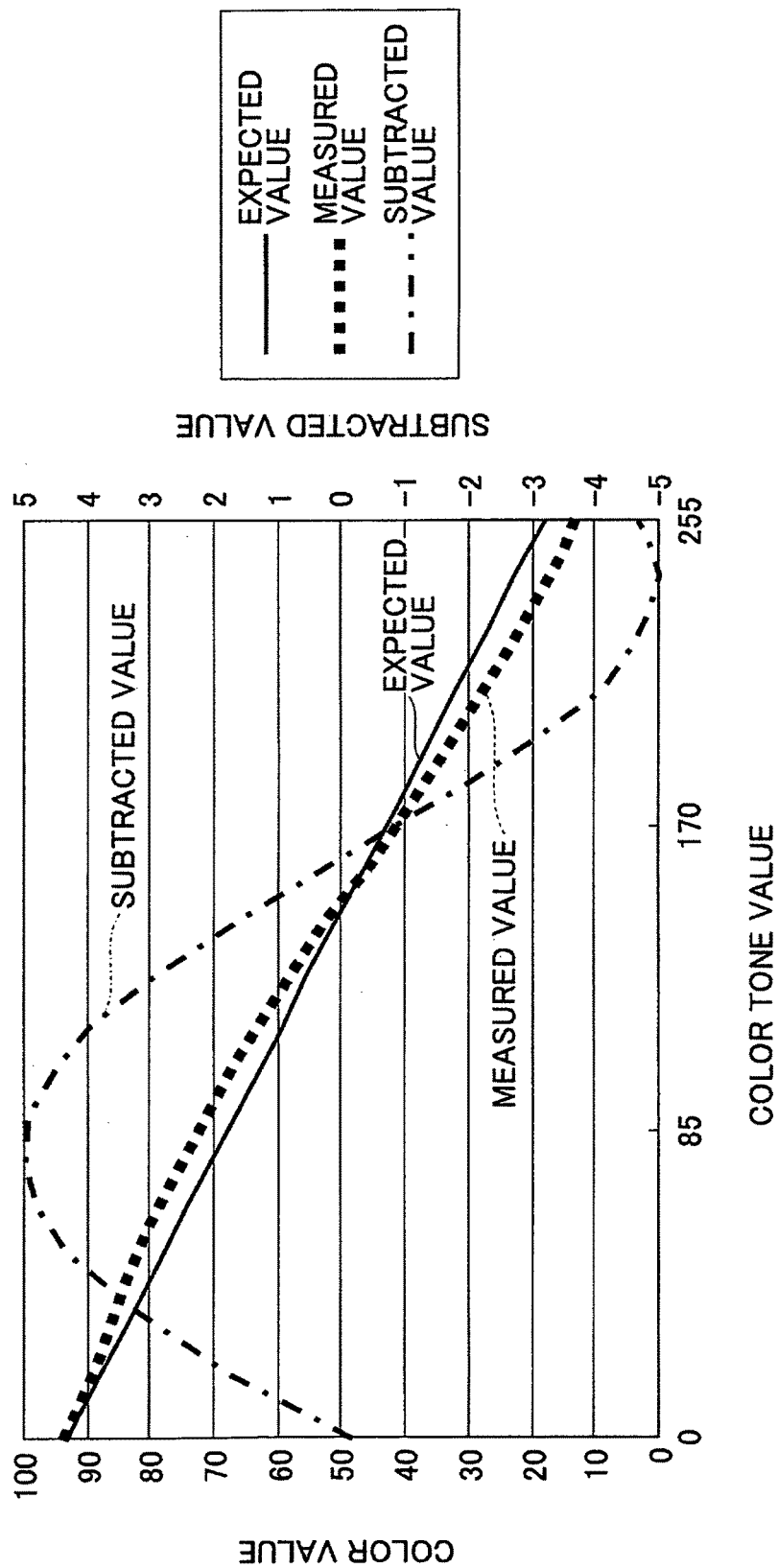
FIG. 9 shows the relationship between the color tone value and the color value of scanned data of the patch row shown in FIG. 7A.

FIG. 9 shows the relationship between the color tone value and the color value of scanned data of the patch row 51 shown in FIG. 7A. The color value of scanned data constitutes the measured value. Since the patch row 51 includes the color tone value ranging from 0 to 255, the lateral axis is ranging from 0 to 255. The solid line, shown in FIG. 9, shows characteristics of expected value. The characteristics, shown in FIG. 9, show value of scanned data under a condition where the patch chart 500 does not include the mechanical unevenness of color strength. The expected value is used as reference value for correcting the temporal change. The expected value shows 250 when the color tone value is 0, and the expected value shows 20 when the color tone value is 255. The relationship between the expected value and the color tone value will be described in detail below. The color value is 90 upper when the color tone value is 0, and the color value is 20 lower when the color tone value is 255.

The dashed line, shown in FIG. 9, shows characteristics of measured value obtained by scanning the patch chart 500 by the scanner 200 under a condition where the scanner 200 does not include the temporal change. The measured value is value of the scanned data. The measured value includes the mechanical unevenness of color strength in the sub-scanning direction, and fluctuates over and under the expected value. The measured value is greater than the expected value in a state where the color tone value is less than 170. The measured value is smaller than the expected value in a state where the color tone value is more than 170.

Alternate long and short dash line shows characteristics of subtracted value obtained by subtracting the measured value from the expected value. The right side vertical axis in FIG. 9 shows the subtracted value. The subtracted value is positive in a state where the color tone value is less than 170. The subtracted value is negative in a state where the color tone value is more than 170. Color tone characteristics, obtained from the color tone correction parameter, strain around the color tone value where the subtracted value is relatively large. The color tone correction parameter generated on the basis of the measured value includes strained color tone characteristics, and causes color tone step which is caused by extreme color value change. Thus, the patch data 31 shown in FIG. 7A is not appropriate.

Figure 7B:
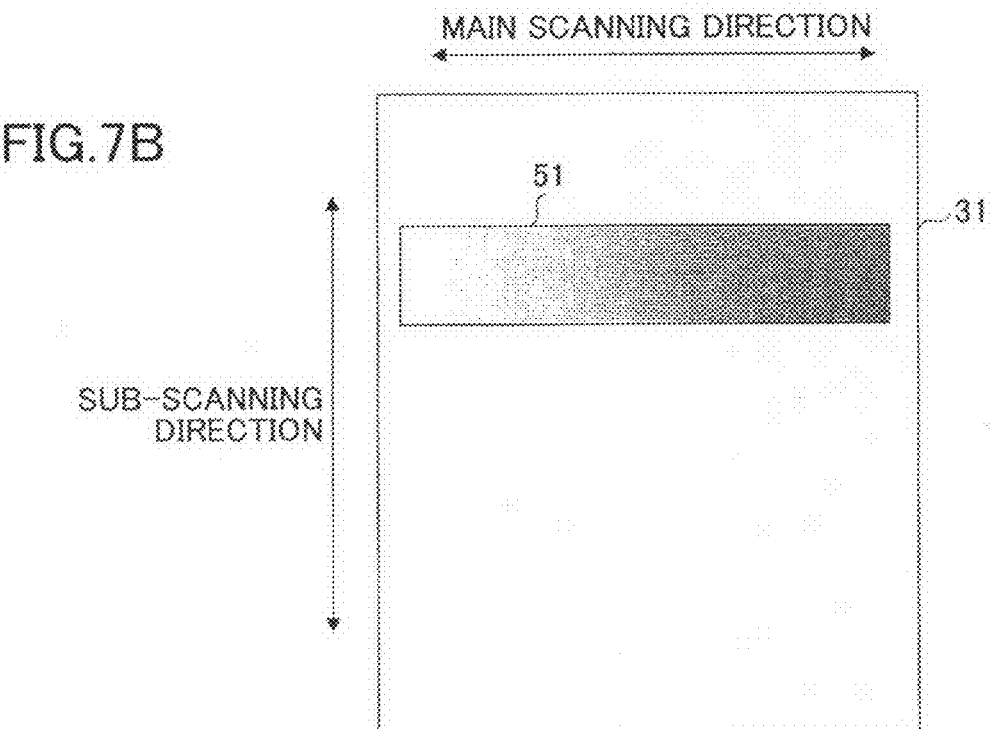
FIG. 7B shows a schematic drawing of a single color patch row printed on a sheet, wherein the color tone values of the single color patches are different from each other and are arranged in a sequential order in a main scanning direction of the photoconductive drum.

The relationship between the expected value and the color tone value obtained from the patch row 51, which is shown in FIG. 7B, will be described in detail below. The color tone values, included in the patch 51 shown in FIG. 7B, are different from each other and are arranged in a sequential order in the main scanning direction. The patch row 51 shown in FIG. 7B is corresponding to a patch row which is obtained by rotating the patch row 51 shown in FIG. 7A by 90 degrees. The color tone value may be changed in either direction from left to right or right to left on the sheet.

Figure 10:
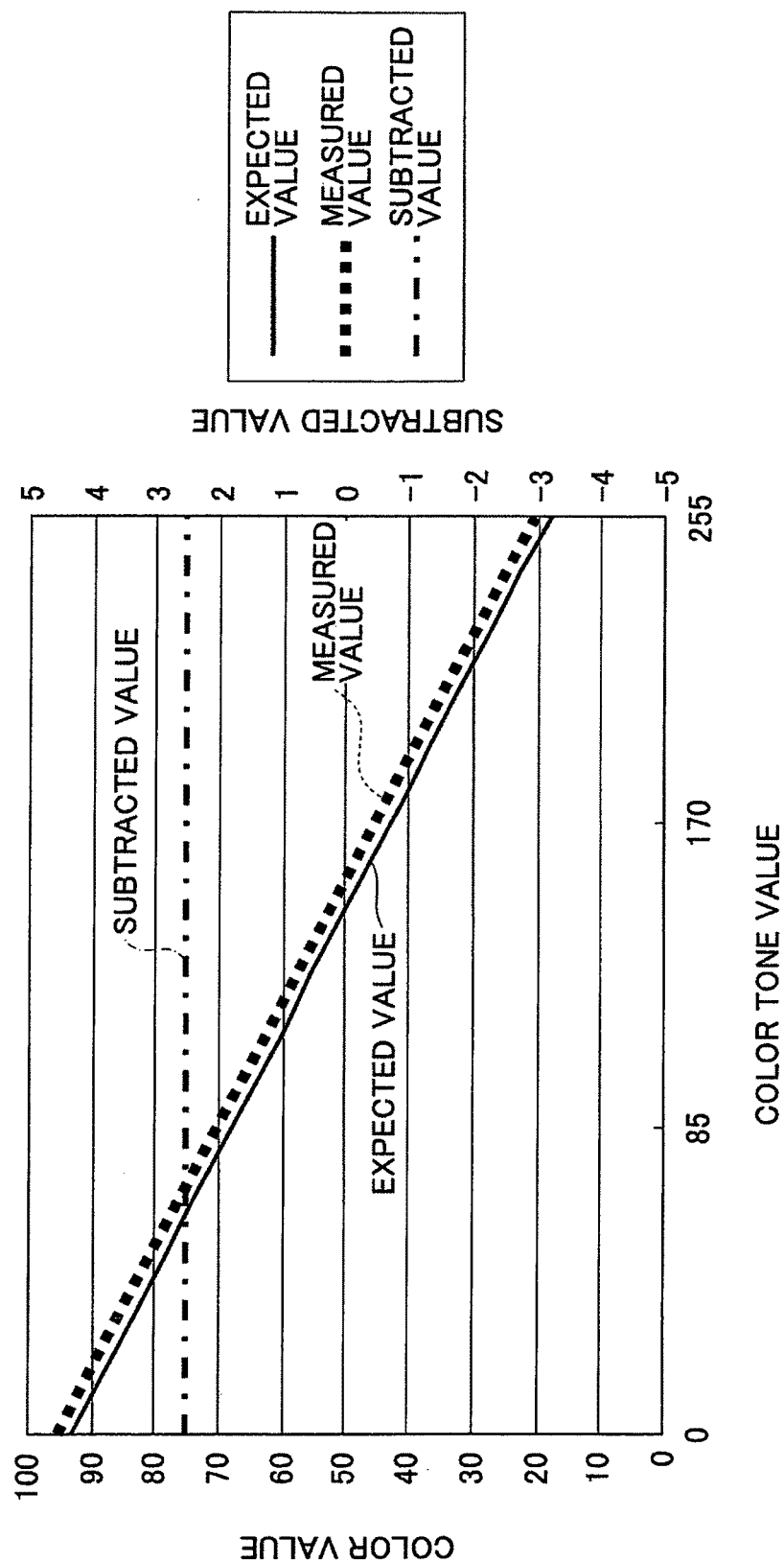
FIG. 10 shows exemplary relationship between the color tone value and the color value of the patch row shown in FIG. 7B.

FIG. 10 shows exemplary relationship between the color tone value and the color value of the patch row 51 shown in FIG. 7B. Since the patch row 51 includes the color tone value ranging from 0 to 255, the lateral axis is ranging from 0 to 255. The solid line, shown in FIG. 10, shows characteristics of expected value which constitutes value of the scanned data under a condition where the patch chart 500 does not include the mechanical unevenness of color strength. The expected value is used as reference value for correcting the temporal change. The expected value shows 250 when the color tone value is 0, and the expected value shows 20 when the color tone value is 255. The relationship between the expected value and the color tone value will be described in detail below. The color value is 90 upper when the color tone value is 0, and the color value is 20 lower when the color tone value is 255.

The dashed line, shown in FIG. 10, shows characteristics of measured value obtained by scanning the patch chart 500 by the scanner 200 under a condition where the scanner 200 does not include the temporal change. Alternate long and short dash line shows characteristics of subtracted value obtained by subtracting the measured value from the expected value. The measured value is value of the scanned data. The measured value includes the mechanical unevenness of color strength in the sub-scanning direction. The color values of the measured values are different from each other and are arranged in a sequential order in the sub-scanning direction, but are not different from each other in the main scanning direction. Since the location in the sub-scanning direction is the same for every color tone value, the subtracted value shown in FIG. 7B is almost constant against the color tone values from 0 to 255. Thus, the measured value shows the color tone characteristics which are obtained by shifting the characteristics of the expected value in parallel. Although the color tone correction parameter generated on the basis of the measured value differs from the color tone characteristics which are to be obtained, the color tone step caused by extreme color value change will not be caused.

Thus, the patch row 51 should be formed in the main scanning direction in a state where the mechanical unevenness of color strength is relatively large in the sub-scanning direction.

It is preferable that the patch data 31 (shown in FIG. 4) is to be printed on a sheet so that the patch row 51 of the character portion M224 is located on the top portion in the rotational direction of the photoconductor drum 43. In other words, it is preferable that the patch row 51 is arranged in the direction which is orthogonal to the direction in which the variation of the color strength is relatively large.

The advantage of arranging a plurality of the patch rows 51 will be described below. As described above, the unevenness of color strength may be formed readily in the sub-scanning portion.

Figure 11A:
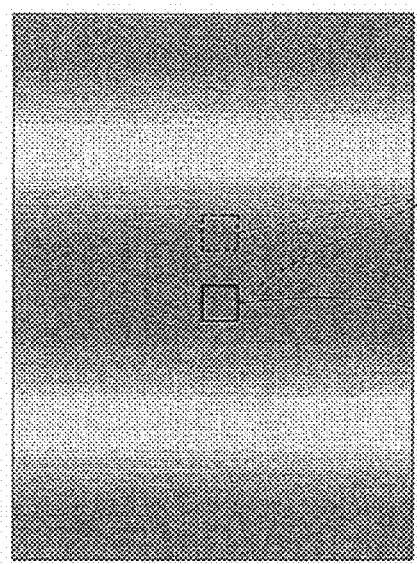
FIG. 11A shows exemplary unevenness of color strength in a state where the whole surface of a sheet is painted in particular color of the same color tone value.

FIG. 11A shows exemplary unevenness of the color strength in a state where the whole surface of a sheet is painted in particular color of the same color tone value. Since the unevenness of the color strength mostly includes periodicity, in general, the unevenness of the color strength is shown as sine wave. In a state where there is only one patch row 51, the patch row 51 may be formed in high color strength portion of the photoconductor drum 43, or be formed in low color strength portion of the photoconductor drum 43. Thus, the maximum variation of the unevenness of the color strength of the patch row 51 is corresponding to the half value of the minimum mechanical unevenness of the color strength and the maximum mechanical unevenness of the color strength, in a state where there is only one patch row 51.

In a state where there are same two patch rows 51, it is rare that both of two patch rows 51 are formed in the highest color strength portion of the photoconductor drum 43. Further, it is possible to form the patch data 31 so that the both of two patch rows 51 are formed in the highest color strength portion of the photoconductor drum 43. Thus, it is possible to determine the maximum variation of the unevenness of the color strength of the patch row 51 is smaller than the subtracted value obtained by subtracting the minimum unevenness of the color strength from the maximum unevenness of the color strength.

Figure 11B:
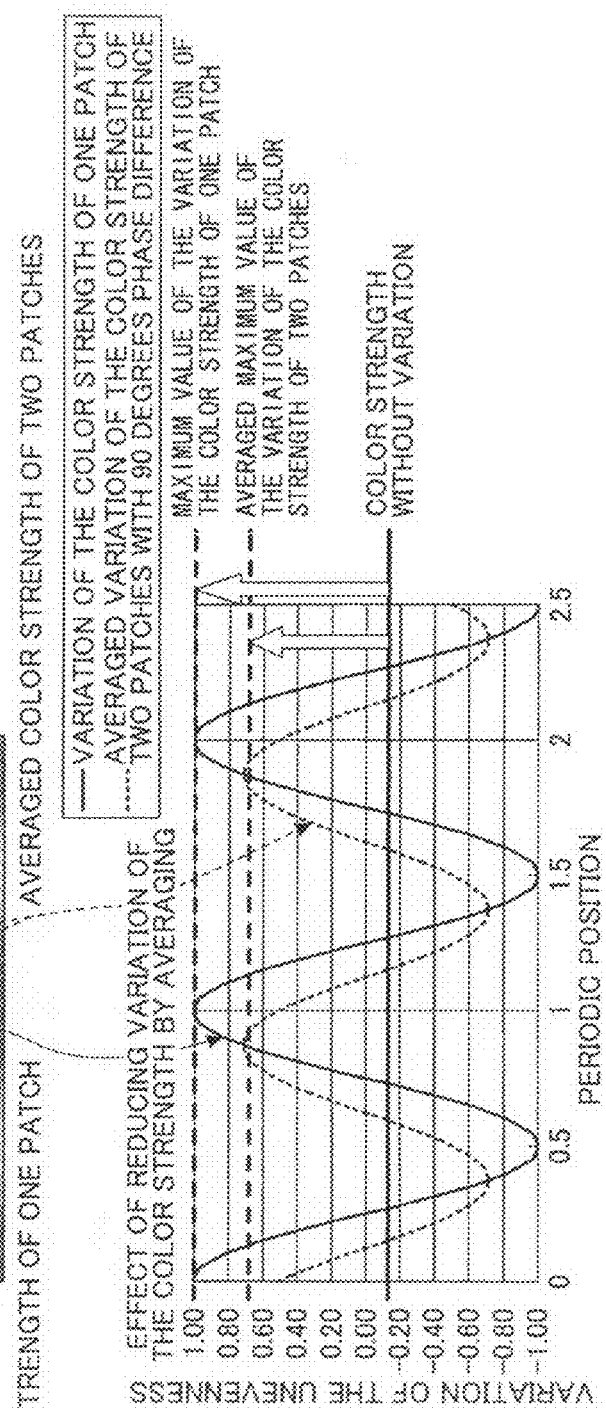
FIG. 11B shows exemplary relationship between number of the same color patch rows and the maximum value of variation of the color strength.

FIG. 11B shows exemplary relationship between number of the same color patch rows 51 and the maximum value of the variation of the color strength. It is possible to reduce variation of the unevenness of the color strength of the same color two patch rows 51 between −0.7 to +0.7, in a case where the variation of the unevenness of the color strength of the one color patch row 51 is ranging from −1 to +1. The same color two patch rows 51 are located to have 90 degrees phase difference. Herein, 90 degrees is corresponding to the one fourth of one rotation (360 degrees) of the photoconductor drum 43.

FIG. 11C shows exemplary relationship between phase difference of the two patch rows 51 and the maximum value of averaged variation of the color strength. In FIG. 11C, it is assumed that the mechanical unevenness of the color strength is caused by rotation of the photoconductor drum 43. Thus, the variation of the color strength becomes the smallest in a case where the two patch rows 51 include 180 degrees phase difference. In this case, the unevenness of each of the two patch rows 51 balances each other. Further, FIG. 11C shows that the maximum value of average variation of the two patch rows 51 becomes larger than that of the one patch row 51.

As described above, it is possible to reduce the mechanical unevenness of the color strength by giving an appropriate phase difference between the two patch rows 51 in the sub-scanning direction.

Hereinafter, generating process of the color tone correction parameter using the patch data will be described with reference to FIG. 3B.

<S10: Screening Process>

The patch chart output portion 34 reads out the patch data 31 from the patch data storage 33, prints the patch chart 500 on a sheet, and then output the sheet when the user switches the mode of the image processing system 100 to the color tone correction mode via the operation panel 16.

Figure 12:
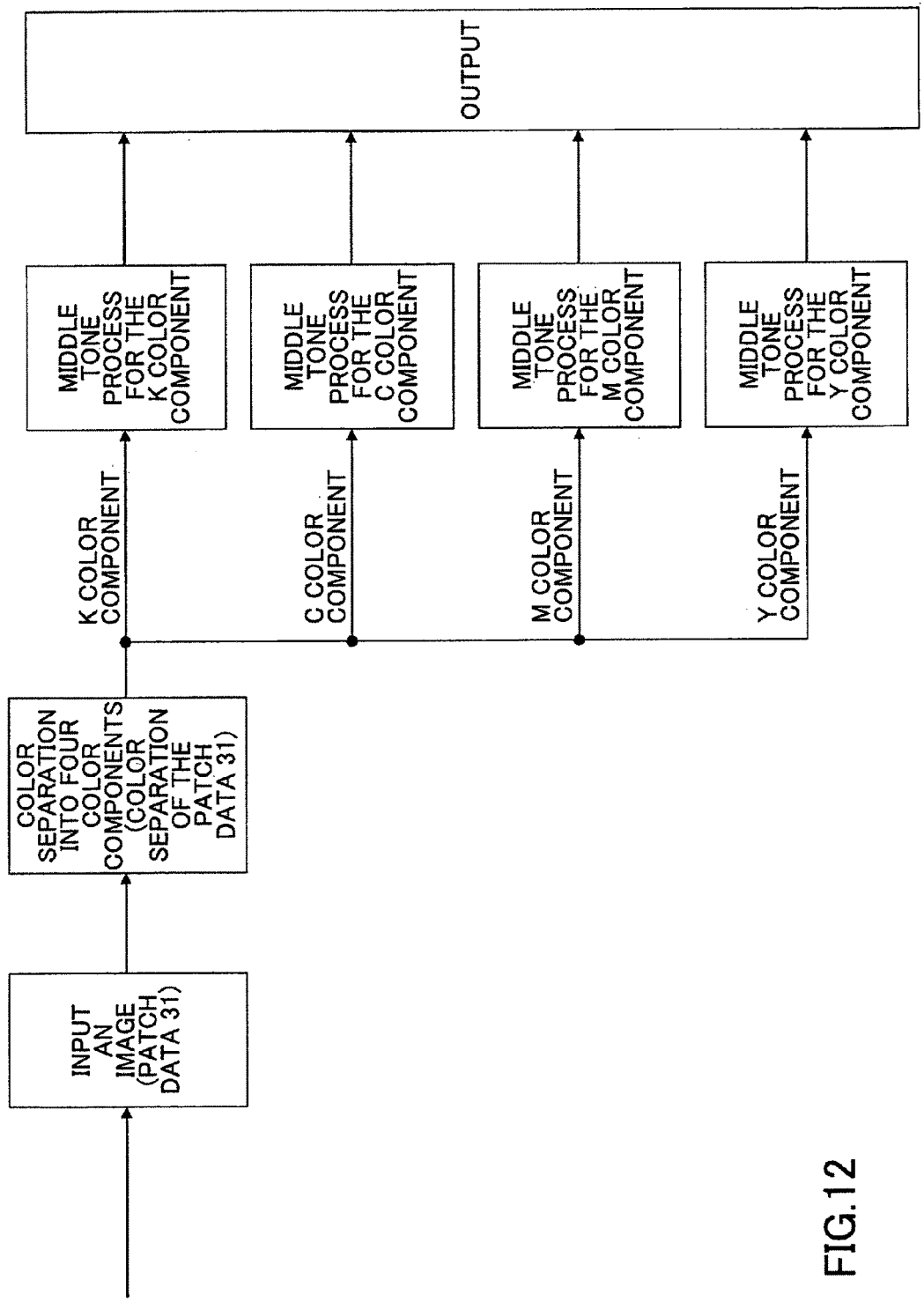
FIG. 12 shows exemplary color separation process of patch data in screening process.

FIG. 12 shows exemplary color separation process of the patch data in the screening process. The patch chart output portion 34 performs low number scanning lines screening process or high number scanning lines screening process on the patch data 31 read from the patch data storage 33. The patch chart output portion 34 separates the patch data 31 into the color components of C, M, Y and K. The patch chart output portion 34 performs middle tone process and outputs output color tone value based on the relationship between the color tone value and threshold value, for each color component and for every pixel.

Hereinafter, the middle tone process of the K color will be described. The middle tone processes of other three colors C, M and Y are performed in the same manner. Threshold value for each color may be different.

FIG. 13 shows flowchart of the middle tone process. The middle tone process for outputting the output color tone value of 0, 85, 170 or 255 by using the K component of the patch data 31 as input color tone value will be described.

The patch chart output portion 34 determines whether the input color tone value is greater than threshold value C (S1001). The patch chart output portion 34 outputs the output color tone value of 255 (S1004), if the input color tone value is greater than the threshold value C (S1001 Yes).

The patch chart output portion 34 compares the input color tone value and threshold value B (S1002), if the input color tone value is not greater than the threshold value C (S1001 No). The patch chart output portion 34 outputs the output color tone value of 170 (S1005), if the input color tone value is greater than the threshold value B (S1002 Yes).

The patch chart output portion 34 compares the input color tone value and threshold value A (S1003), if the input color tone value is not greater than the threshold value B (S1002 No). The patch chart output portion 34 outputs the output color tone value of 85 (S1006), if the input color tone value is greater than the threshold value A (S1003 Yes).

The patch chart output portion 34 outputs the output color tone value of 0 (S1007), if the input color tone value is not greater than the threshold value A (S1003 No).

In an exemplary state where the threshold values A, B and C are 231, 235 and 240 respectively, and the input color tone value is 237, then the patch chart output portion 34 outputs the output color tone value of 170. The image processing apparatus 300 includes a threshold table for setting the threshold values A, B and C.

FIGS. 14A, 14B and 14C show schematic drawings of exemplary tables of the threshold values A, B and C, respectively. Each of these tables constitutes threshold matrix. FIGS. 14A, 14B and 14C show the threshold matrix used in the low number scanning lines screening process. It is possible to form halftone dot screen of 141 lines with 45 degrees for K color at 600 dpi by determining the threshold value based on the threshold matrixes shown in FIGS. 14A, 14B and 14C. The patch chart output portion 34 determines the output color tone value by comparing the input color tone value and the threshold value.

In this embodiment, the output color tone value takes the value of 0, 85, 170 or 255. FIG. 14A shows the threshold value A which is used when the patch chart output portion 34 determines whether to output the halftone dots corresponding to the output color tone value of 85 or not. FIG. 14B shows the threshold value B which is used when the patch chart output portion 34 determines whether to output the halftone dots corresponding to the output color tone value of 170 or not. FIG. 14C shows the threshold value C which is used when the patch chart output portion 34 determines whether to output the halftone dots corresponding to the output color tone value of 255 or not.

Hereinafter, process for determining the threshold value based on the threshold matrix. Each cell included in the threshold matrix is corresponding to the single pixel. Thus, coordinate of an attention pixel in the threshold matrix is determined by corresponding location of the attention pixel in the threshold matrix when the threshold matrix is repeatedly lined into an output image in the form of tiles.

In a case where the threshold matrix has the sizes of w horizontal pixels and h vertical pixels, the threshold value of the cell located at (X mod w) in horizontal axis and at (Y mod h) in the vertical axis is used for the attention pixel located at X in horizontal direction and at Y in vertical direction. Herein, mod is remainder operator. (X mod w) shows remainder when X is divided by w.

For example, the threshold matrix shown in FIG. 14A includes twelve horizontal pixels (w=12) and twelve vertical pixels (h=12), the threshold value of the cell located at (x,y)=(1,2) is used for the pixel of (X,Y)=(13,26). In this case, the threshold values A, B and C are 231 (shown in FIG. 14A), 235 (shown in FIG. 14B) and 240 (shown in FIG. 14C), respectively. The patch chart output portion 34 determines whether to output the halftone dot corresponding to the output color tone value of 0, 85, 170 or 255, or not by determining one threshold value from the threshold values A~C, and comparing the threshold value and the input color tone value for each coordinate included in the output image.

In the high number scanning lines screening process, threshold values shown in FIGS. 15A, 15B and 15C are used for K color instead of the threshold values shown in FIGS. 14A, 14B and 14C as described in the low number scanning lines screening process. The threshold matrixes shown in FIGS. 15A-15C are used for forming halftone dot screen of 212 lines with 45 degrees for K color at 600 dpi.

<S20: Patch Chart Outputting Process>

The patch chart output portion 34 requests printing of the patch data 31 to the printer 600. The printer 600 prints the patch chart 500 on a sheet based on the patch data 31, since the patch chart output portion 34 determines whether to output the halftone dots corresponding to the output color tone value of 0, 85, 170 or 255 or not.

<S30: Optical Scanning of the Patch Chart 500>

The scanner 200 optically scans the patch chart 500 when the user puts the patch chart 500 on the contact glass of the scanner and operates the scanner. In the color tone correction mode, the scanner 200 scans the patch chart 500. It is necessary to face down the patch chart 500 on the contact glass and to align the arrow printed on the sheet to the reference position.

The scanner 200 includes a color line sensor having an photoelectric conversion element such as a color CCD or a color CMOS, and an A/D converter. The scanner 200 converts the color tone data into an RGB image data which includes eight to ten bits for each of R, G and B. The patch chart input portion 37 performs processes such as a shading correction to the RGB image data.

Figures 16, 17:
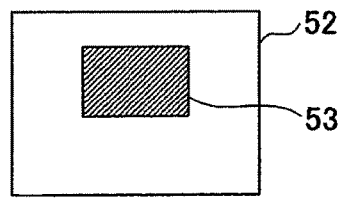
FIG. 16 shows the patches and a part of the patches.
FIG. 17 shows an exemplary table including the color tone values and scanned value of the black patches in picture portion.

FIG. 16 shows the patches and a part of the patches. The patch chart input portion 37 does not read the whole area of the patch 52, but reads a predetermined area 53 located near the center of the patch 52. The predetermined area 53 has 128×96 pixels at 600 dpi, for example. Since the edge portion of the patch 52 is closer to another patch 52 of different color than the predetermined area 53, scanned data of the edge portion of the patch 52 may be degraded. Thus, the patch chart input portion 37 reads the predetermined area 53 located near the center of the patch 52. The patch chart input portion 37 reads the predetermined area 53, averages the scanned data obtained from the predetermined area 53, and outputs average value as the measured value.

As described above, the patches 52 of the patch chart 500 shown in FIG. 4, which are arranged adjacent to each other in the main scanning direction, include close color tone value. Since the patches including the close color tone value show similar reflection characteristics, it is possible to reduce the reflection effect caused by different reflection characteristics when the scanner 200 scans single patch 52.

Since the patch chart 500 includes C, M, Y and K colors, the patch chart input portion 37 obtains the average value of data of a green channel G in the scanner 200 for K patch 52 and M patch 52. Similarly, the patch chart input portion 37 obtains the average value of the data of a red channel R in the scanner 200 for C patch 52. Similarly, the patch chart input portion 37 obtains the average value of the data of a blue channel B in the scanner 200 for Y patch 52. Each average value is obtained from 128×96 pixels. The patch chart input portion 37 obtains the average values as the measured values. The scanner 200 includes the channels in which the scanned data takes the wide range of the values for each color patch 52.

<S40: The Color Tone Correction Parameter Generating Process>

Hereinafter, the color tone correction parameter generating process performed by the color tone correction parameter processing portion 32 will be described. As described above and shown in FIG. 4, the patch data 31 of the present embodiment includes two patches 52 of the same color and the same color tone value which are included in the picture portion 210. For example, both of K08 patch 52 of the picture portion K201 and K08 patch 52 of the picture portion K211 are the same patches 52 for black color having the color tone value of 128. The color tone correction parameter processing portion 32 averages scanned value (value of the scanned data) of the K08 patch 52 of the picture portion K201 and scanned value of the K08 patch 52 of the picture portion K211, and outputs the averaged scanned value as measured value.

FIG. 17 shows an exemplary table including the color tone values and scanned value of the black patches K00~K16 in the picture portion 210. As shown in FIG. 17, the smaller the color tone value becomes, the larger the scanned value becomes. The larger the color tone value becomes, the smaller the scanned value becomes.

For example, in a case where the scanned value of the K08 in the picture portion K201 is 80, and where the scanned value of the K08 in the picture portion K211 is 70, the measured value of the color tone values "128" of the K08 black patches is 75 which is obtained by averaging the two scanned values. As for the picture portion 210, the measured value is derived by averaging the two scanned values which are obtained from the two patches of the same color tone value.

Since the character portion 220 includes only one patch 52 for each color and for each color tone value, the measured value of the patch 52 is obtained as scanned value of the patch 52. In a case where the picture portion 210 includes more than three patches 52 for each color and for each color tone value, the measured value is derived by averaging the all the scanned values which are obtained from the more than three patches 52 of the same color tone value. In a case where the character portion 220 includes more than two patches 52 for each color and for each color tone value, the measured value is derived by averaging the all the scanned values which are obtained from the more than two patches 52 of the same color tone value. Further, the measured value may be derived by weighted averaging, or median value of the scanned values may be used as the measured value.

The color tone correction parameter processing portion 32 generates the color tone correction parameter so that the color tone value of the patch data 31 and the measured value satisfy predetermined relationship of these values. Since the color tone correction parameter is used for correcting the color strength, the generation of the color tone correction is synonymous with generating gamma correction table.

FIG. 18 shows a table showing relationship between the color tone values and the expected values of the measured values. FIG. 18 shows an ideal table in an ideal condition where the color tone correction parameter becomes zero, because the measured value matches the expected value. The color tone correction parameter is generated so that the measured value obtained by the scanner 200 is corrected to "75" in a case where the patch 52 is going to be printed by the printer 600 based on the color tone value of "136".

As shown in FIG. 18, the expected value corresponding to the color tone value of "136" is "75". In a case where the color tone value corresponding to the measured value of "75" is "128 as shown in FIG. 17, the color tone correction parameter processing portion 32 generates the color tone correction parameter (i.e. the gamma correction table) which corrects the color tone value of "136" to "128".

Figure 19:
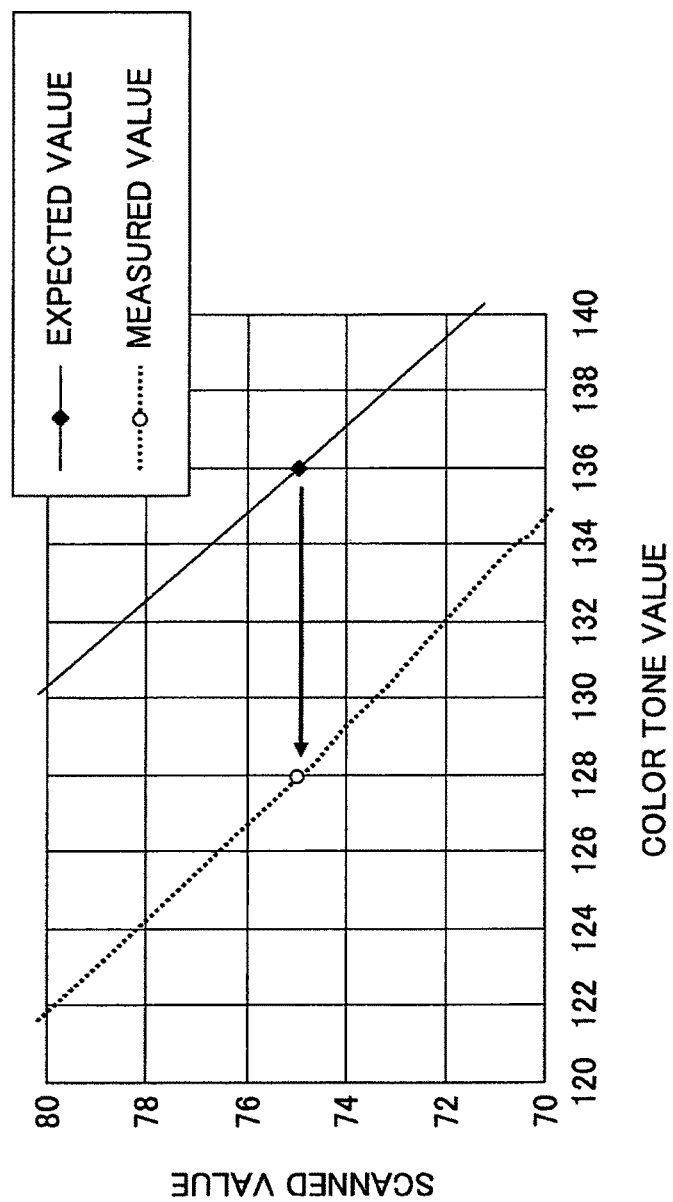
FIG. 19 shows exemplary relational characteristics of the expected values and the measured values.

FIG. 19 shows exemplary relational characteristics of the expected values and the measured values. The solid line in FIG. 19 shows the relational characteristics between the color tone values and the expected value. The dashed line in FIG. 19 shows the relational characteristics between the color tone values and the measured values. In a case where the color tone value corresponding to measured values of "75" is "128", the color tone value of "136" in the expected value characteristics is corrected to "128" so that the measured value of "75" is obtained. Thus, it is possible to correct the temporal change, and expected color tone characteristics are obtained.

The printer 600 refers the color tone correction parameter, corrects the color tone value of "136" in the expected value characteristics to "128" in the measured value characteristics as shown in FIG. 19, and print outs a sheet based on the corrected color tone value. It is expected that the color value which is close to the measured value is obtained by correcting the color tone value from "136" to "128".

Since the color tone value takes seventeen values, the measured value which is corresponding to the expected value is not always obtained. As shown in FIG. 18, for example, the expected value corresponding to the color tone value of "221" is "30", but there is no patch 52 which has measured value of "30". In such a case, the color tone correction parameter processing portion 32 generates the color tone correction parameter which corrects color tone value corresponding to the expected measured value of "30" by linear interpolation.

Figure 20:
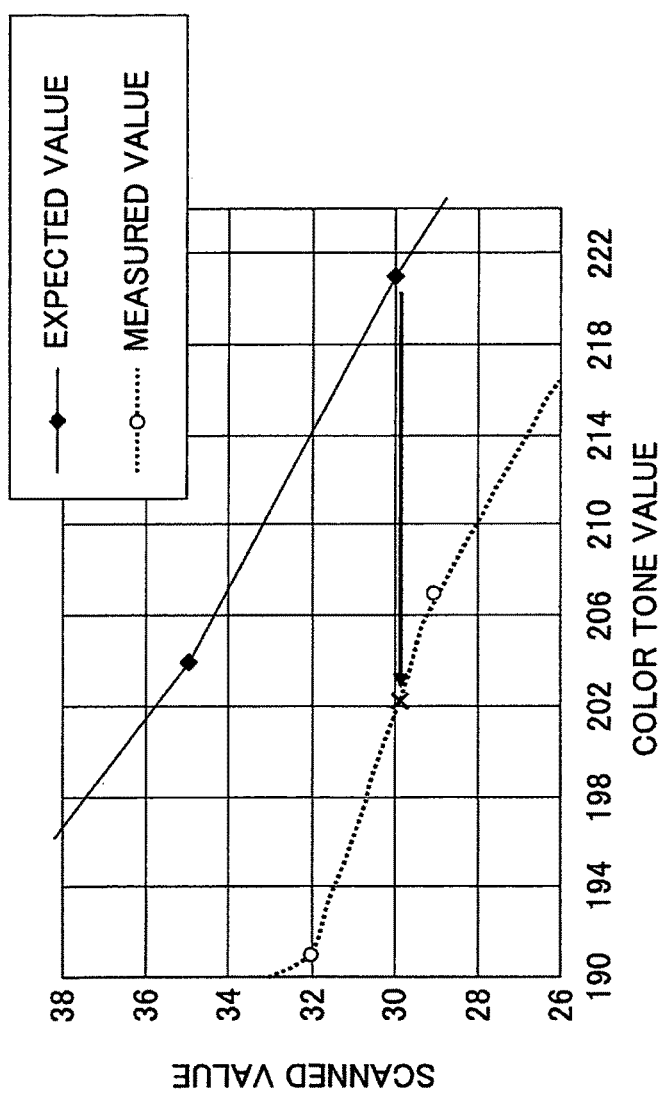
FIG. 20 shows a flowchart of linear interpolation process for the color tone value and the expected value.

FIG. 20 shows a flowchart of linear interpolation process for the color tone value and the expected value. In a case, as shown in FIG. 18, where the expected value of the color tone value of "221" is "30", and the expected value of the color tone value of "204" is "35", for example. Further, as shown in FIG. 17, the measured value of the K12 patch 52, in the picture portion 210, which has the color tone value of "191" is "32", the measured value of the K13 patch 52, in the picture portion 210, which has the color tone value of "207" is "29", for example. The color tone value of "202" which is corresponding to the measured value of "30" is obtained by the linear interpolation process. Thus, it becomes possible to obtain the expected color tone characteristics and to correct the temporal change by correcting the color tone value from "221" to "202".

As described above, the color tone correction parameter processing portion 32 generates the gamma correction table (conversion table) which is corresponding to the seventeen color tone values, and generates the color tone correction parameter which includes the corrected color tone value ranging from "0" to "255" in increments of one.

Although, as described above, the patch chart 500 printed on the sheet is scanned by the scanner 200 in order to measure the color tone value, the color tone value is measured by a color measuring apparatus such as color strength meter, color value meter or the like. In this case, the color tone correction parameter processing portion 32 generates the color tone correction parameter by using a table which includes the relationship between color tone value and the color strength or the color value instead of using the expected value corresponding to the color tone value.

<S50: Color Tone Correction Parameter Storing Process>

The color tone correction parameter setting portion 35 sets the color tone correction parameter to the printer 600 so that the printer 600 performs the printing process based on the color tone correction parameter. The color tone correction parameter may be stored in the color tone correction parameter storage 36.

<Printing Process Utilizing the Color Tone Correction Parameter>

Figure 21:
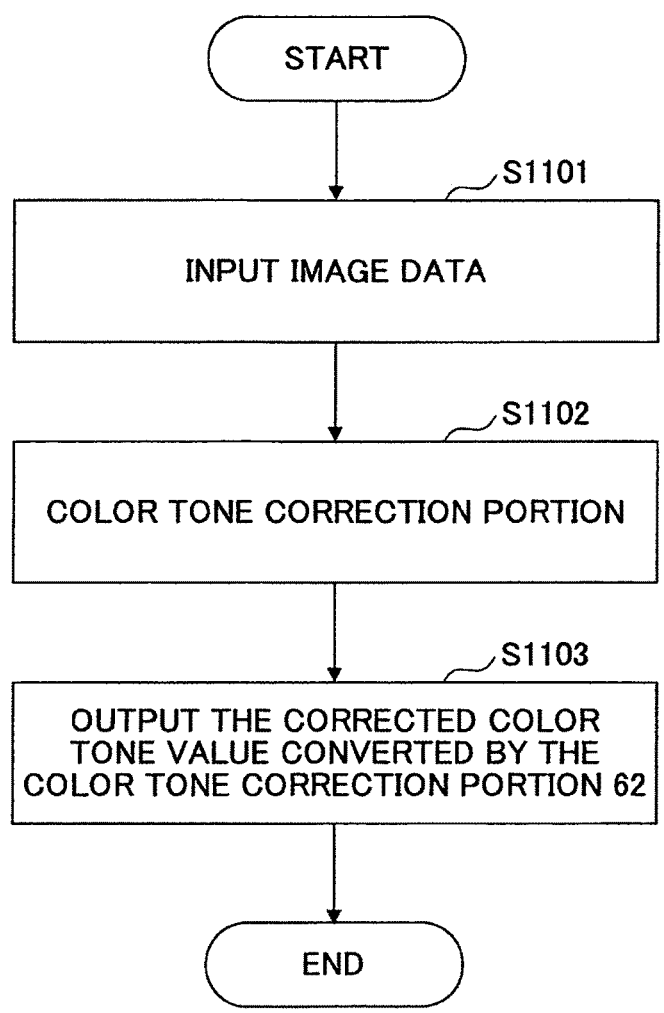
FIG. 21 shows a flowchart of the printing process utilizing color tone correction performed by the image processing system.
Figure 22:
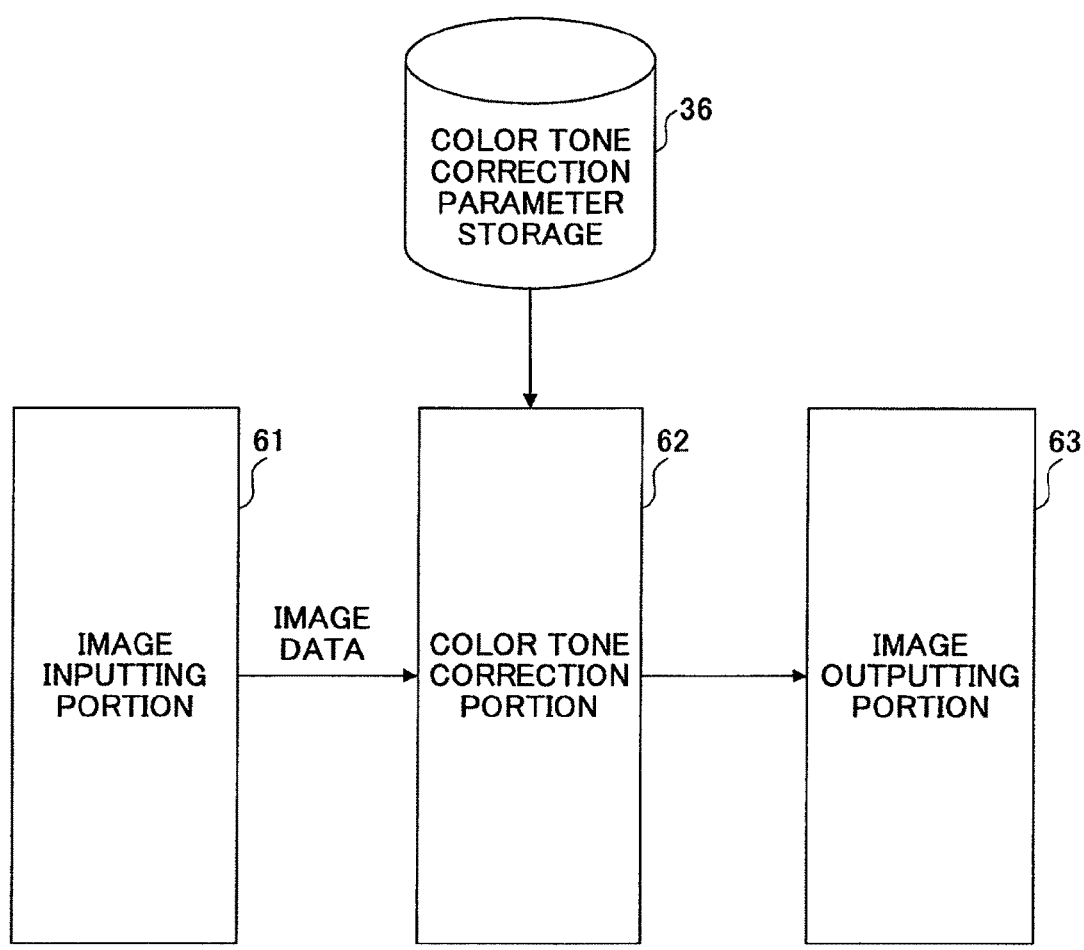
FIG. 22 shows a schematic drawing of functional block diagram of the image processing system utilizing color tone correction.

FIG. 21 shows a flowchart of the printing process utilizing color tone correction performed by the image processing system 100. FIG. 22 shows a schematic drawing of functional block diagram of the image processing system 100 utilizing color tone correction.

In a case where the image processing apparatus is realized as the MFP, an image inputting portion 61 is realized by the scanner 200, an interface which is connected to an information processing apparatus via a network, and facsimile machine or the like. A color tone correcting portion 62 is realized by the CPU 11 which executes the program 30. An image outputting portion 63 is realized by, for example, an interface which is connected to an engine portion or the printer 600 per se.

The image inputting portion 61 inputs the image data one by one corresponding to one pixel (S1101). The image data includes the color tone value represented by integer number from 0 to 255 for each pixel.

The color tone correction portion 62 converts the color tone value of the image data input from the image inputting portion 61 into the corrected color tone value (S1102). The color tone correction portion 62 performs the S1102 process f one by one corresponding to one pixel.

The image outputting portion 63 outputs the corrected color tone value converted by the color tone correction portion 62 one by one corresponding to one pixel (S1103). Thus, the laser beam is modulated based on the converted image data, and the variation of the color strength caused by the temporal change is reduced.

As described above, the image processing system 100 according to the present embodiment can generate the color tone correction parameter by using the patch rows arranged in parallel in the main scanning direction. Thus the nonuniformity of color strength such as the color tone step caused by the temporal change is reduced. Further, the mechanical unevenness of color strength is reduced by using the two patch rows 51 arranged in parallel and spaced apart in the sub-scanning direction. The color tone correction parameter which can reduce the mechanical unevenness of color strength is generated by using the two patch rows 51 arranged in parallel and spaced apart in the sub-scanning direction.

Embodiment 2

Hereinafter, the printer 600 utilizing the color tone correction parameter according to the embodiment 1 will be described.

Figure 23:
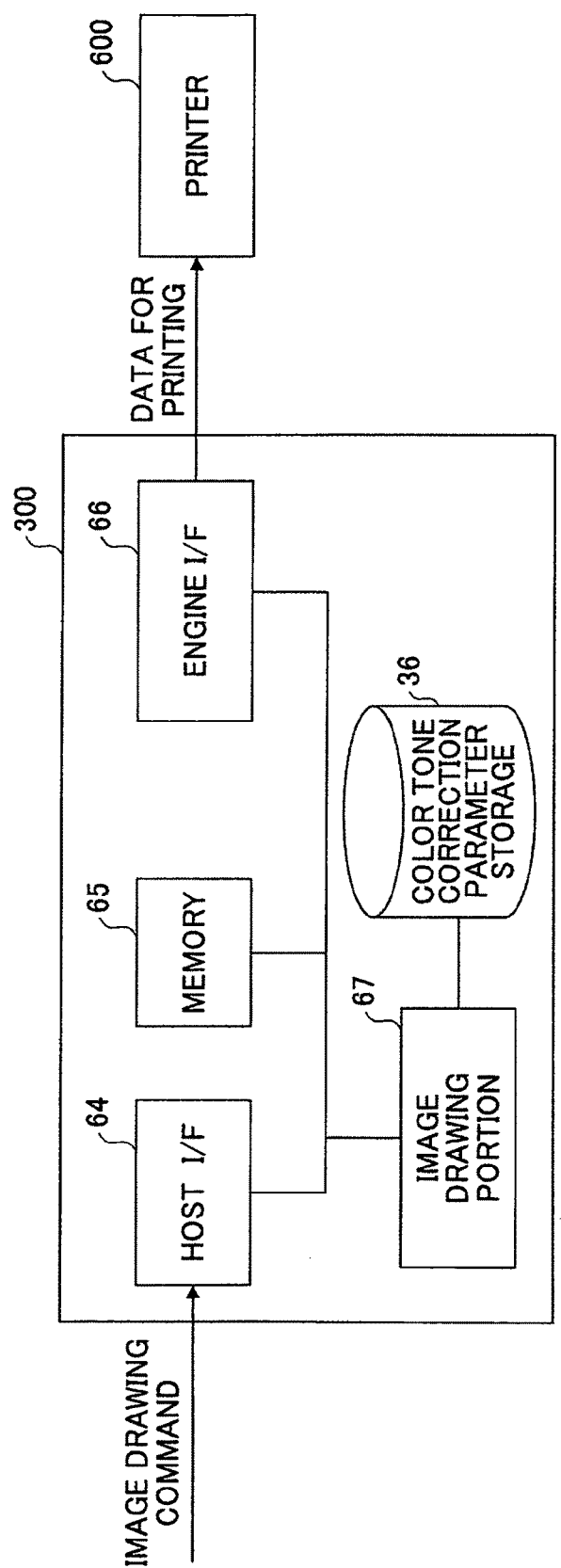
FIG. 23 shows a schematic drawing of functional block diagram of image processing apparatus connected to the printer.

FIG. 23 shows a schematic drawing of functional block diagram of the image processing apparatus 300 connected to the printer 600. The image processing apparatus 300 includes an I/F 64 connected to a host computer (not shown), a memory 65 for storing the image data, an image drawing portion 67 and an engine I/F 66 connected to the engine. The engine is included in the printer 600.

As the image processing apparatus 300 receives an image drawing command from the host computer via the host I/F 64, the image processing apparatus 300 writes an image drawing command into the memory 65. The image drawing portion 67 reads the image drawing command stored in the memory 65 in turn, and generates a bit map data which is to be transmitted to the engine of the printer 600. The image drawing portion 67 outputs a print data, which includes the bit map data, to the engine of the printer 600 via the engine I/F 66 each time the image drawing portion 67 finishes reading the image drawing command of one page of the sheet.

The image drawing command includes a command for drawing an image object, a command for drawing a character object, a command for drawing a graphic object such as lines, and the like. The image drawing portion 67 performs the screening process corresponding to each of the objects of the commands, and performs a gamma converting process corresponding to the screening process.

The image drawing portion 67 performs the low number scanning lines screening process and the gamma converting process utilizing the color tone correction parameter based on the command for drawing the image object. The image drawing portion 67 performs the high number scanning lines screening process and the gamma converting process utilizing the color tone correction parameter based on the command for drawing the character object and the command for drawing the graphic object. The color tone correction parameter corresponding to each of the screening process is generated by the processes described in embodiment 1.

As described above, according to embodiment 2, the printer 600 can correct the nonuniformity of color strength caused by the temporal change and print out the color image on the sheet by utilizing the color tone correction parameter.

Embodiment 3

Hereinafter, a copy machine utilizing the color tone correction parameter according to the embodiment 1 will be described. The copy machine is realized by, for example, the MFP.

Figure 24:
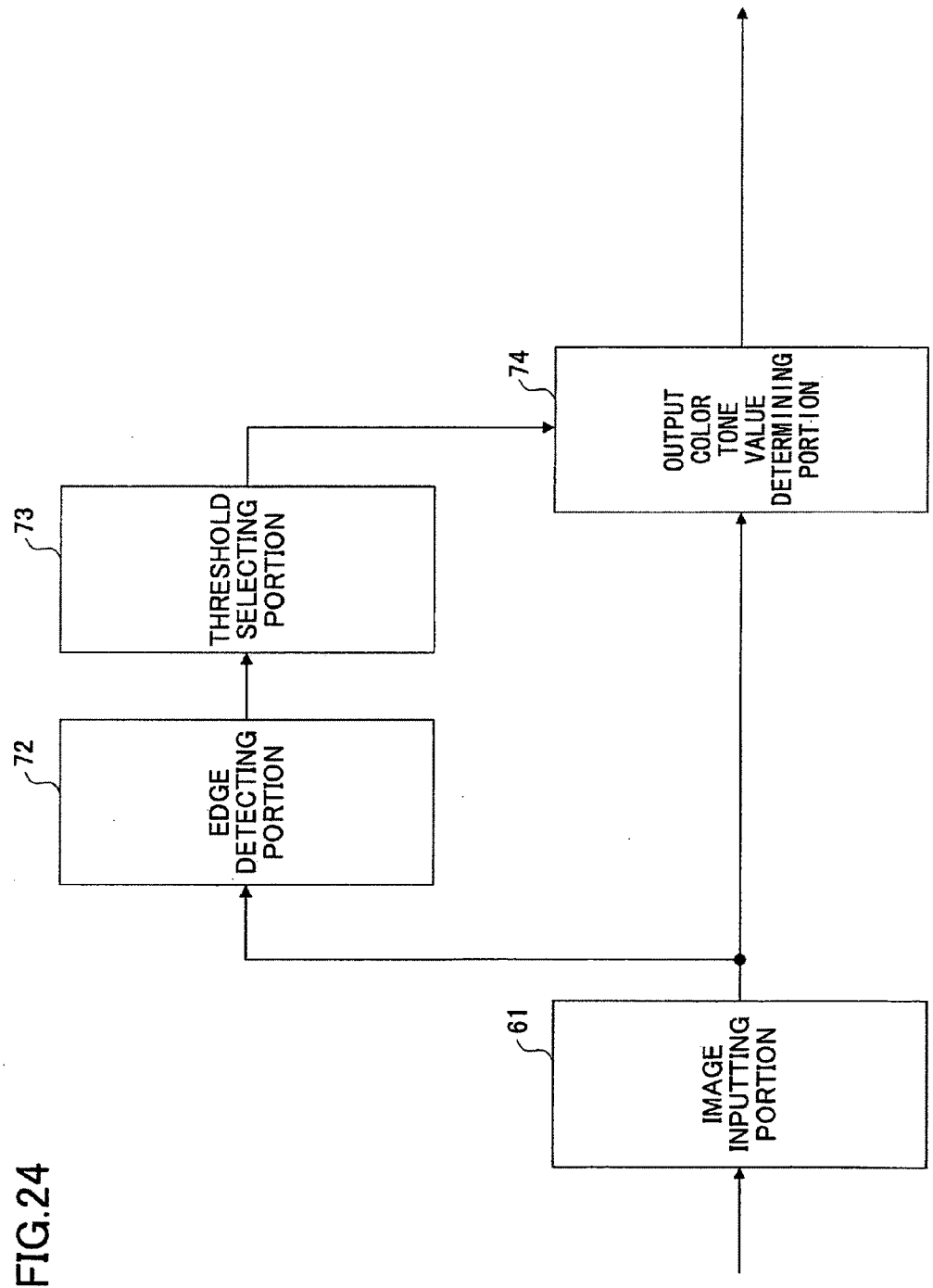
FIG. 24 shows a schematic drawing of functional block diagram of the MFP.

FIG. 24 shows a schematic drawing of functional block diagram of the MFP. The image inputting portion 61 performs color strength correction process and frequency correction process to the image data scanned by the scanner 200, and generates the image data which includes image for each color of C, M, Y and K.

An edge detecting portion 72 detects edge portion in the image data, and transmits detected result to a threshold selecting portion 73. It becomes possible to raise resolving power of the edge portion by utilizing threshold matrix for the high number scanning lines screening process on the edge portion.

The threshold selecting portion 73 determines to select the threshold matrix for the high number scanning lines screening process on the edge portion, if the threshold selecting portion 73 determines that the attention pixel is included in the edge portion based on the detected result of the edge portion. The threshold selecting portion 73 determines to select the threshold matrix for the low number scanning lines screening process on the edge portion, if the threshold selecting portion 73 determines that the attention pixel is not included in the edge portion based on the detected result of the edge portion. The threshold selecting portion 73 transmits threshold matrix information to an output color tone value determining portion 74.

The output color tone value determining portion 74 compares the threshold value corresponding to the attention pixel, and the input value, and determines an output color tone value. The threshold value corresponding to the attention pixel is obtained from the threshold matrix information.

Herein, the error diffusion process may be performed in a case where the attention pixel is included in the edge portion. The screening process, for forming a predetermined screen, may be performed in a case where the attention pixel is not included in the edge portion.

FIG. 25 shows a schematic drawing of functional block diagram of the edge detecting portion 72. A first derivation filter 721 performs first derivation process to the image data input from the image inputting portion 61. The edge detecting portion 72 uses four filters in order to detect gradients of the pixel value in the direction of vertical, lateral and transverse.

FIGS. 26A~26D show a schematic drawing of functional block diagram of the first derivation filter 721. FIG. 26A shows the gradient of the pixel value in lateral direction. FIG. 26B shows the gradient of the pixel value in vertical direction. FIGS. 26C and 26D show the gradient of the pixel value in transverse direction.

The first derivation filter 721 performs product-sum operation of the input color tone value and each of the output of the four filters in order to obtain four first derivation values, and transmits the four first derivation values to an absolute value calculating portion 722. The absolute value calculating portion 722 calculates absolute value of the first derivation values, and transmits them to a maximum first derivation selecting portion 723.

The maximum first derivation selecting portion 723 determines one of the four absolute value of the first derivation values which has the maximum value as maximum first derivation value of the attention pixel, and transmits the maximum first derivation value of the attention pixel to an edge portion determining portion 724.

The edge portion determining portion 724 compares the maximum first derivation value input from the maximum first derivation selecting portion 723 and first derivation threshold value. The edge portion determining portion 724 determines that the attention pixel is included in the edge portion, if the maximum first derivation value is greater than the first derivation threshold value. The edge portion determining portion 724 determines that the attention pixel is not included in the edge portion, if the maximum first derivation value is less than the first derivation threshold value.

The image processing system 100 according to embodiment 3 can raise the resolving power of the edge portion by edge portion determining process, and can print out the color image on the sheet by correcting the temporal change.

As described above, according to embodiment 3, the image processing system 100 can correct the nonuniformity of color strength caused by the temporal change and can raise the performance of the correction of the temporal change by utilizing the patch rows 51 arranged in parallel in the main scanning direction. The image processing system 100 of embodiment 3 can generate the color tone correction parameter which can reduce the nonuniformity of color strength.

The present invention is not limited to the specifically disclosed embodiments, and variations and modifications may be made without departing from the scope of the present invention.

The present application is based on Japanese priority application No. 2009-136559 filed on Jun. 5, 2009 with the Japanese Patent Office, the entire contents of which are hereby incorporated herein by reference.

What is claimed is:

1. An image processing apparatus for causing a printing portion to print photoconductive image data,
    wherein the printing portion prints the photoconductive image data, based on color tone image data, on a sheet by forming the photoconductive image data in a main scanning direction of a photoconductor while rotating the photoconductor in a sub-scanning direction, comprising:
    a color tone image data storing medium for storing the color tone image data configured to include a plurality of color tone values of single color, wherein the plurality of color tone values are different from each other and are arranged in a sequential order;
    a printing procedure request portion configured to request printing of the color tone image data to the printing portion in a state where a patch row of a single color, represented by the plurality of color tone values of the color tone image data of the single color, is arranged in a direction almost parallel with the main scanning direction based on the color tone image data, wherein a distance corresponding to about half circumferential length of the photoconductor is provided in the sub-scanning direction between the neighboring patch rows;
    an image data obtaining portion configured to obtain scanned color tone data, showing scanned value of the patch row, from a scanning portion configured to optically scan the patch row printed on the sheet; and
    a parameter generating portion configured to generate a color tone correction parameter for correcting color tone value of the photoconductive image data by comparing the scanned color tone data and the color tone image data.

2. The image processing apparatus as claimed in claim 1, wherein the color tone image data includes the plurality of color tone values configured to represent a plurality of the patch rows.

3. The image processing apparatus as claimed in claim 2, wherein the plurality of color tone values are arranged to represent the plurality of the patch rows spaced apart each other in sub-scanning direction.

4. The image processing apparatus as claimed in claim 2, wherein the plurality of color tone values are arranged to be changed in the same direction as in each of the plurality of the patch rows.

5. The image processing apparatus as claimed in claim 2, wherein the plurality of color tone values are arranged to have the same value among the plurality of the patch rows at the same position in the main scanning direction.

6. The image processing apparatus as claimed in claim 1, further comprising:
    an edge detecting portion configured to detect an edge portion included in the patch row; and
    a screening portion configured to perform different screening process in a case where the edge portion is detected by the edge detecting portion and in a case where the edge portion is not detected by the edge detecting portion.

7. An image processing method processed in an image processing apparatus which causes a printing portion to print photoconductive image data,
    the printing portion being configured to print the photoconductive image data, based on color tone image data, on a sheet by forming the photoconductive image data in a main scanning direction of a photoconductor while rotating the photoconductor in a sub-scanning direction,
    the image processing apparatus being configured to include a color tone image data storing medium for storing the color tone image data configured to include a plurality of color tone values of single color, wherein the plurality of color tone values are different from each other and are arranged in a sequential order,
    the image processing method comprising:
    requesting printing of the color tone image data to the printing portion in a state where a patch row of a single color, represented by the plurality of color tone values of the color tone image data of the single color, is arranged in a direction almost parallel with the main scanning direction based on the color tone image data, wherein a distance corresponding to about half circumferential length of the photoconductor is provided in the sub-scanning direction between the neighboring patch rows;
    obtaining scanned color tone data, showing scanned value of the patch row, from a scanning portion configured to optically scan the patch row printed on the sheet; and
    generating a color tone correction parameter for correcting color tone value of the photoconductive image data by comparing the scanned color tone data and the color tone image data.

8. The image processing method as claimed in claim 7, wherein the color tone image data includes the plurality of color tone values configured to represent a plurality of the patch rows.

9. The image processing method as claimed in claim 8, wherein the plurality of color tone values are arranged to represent the plurality of the patch rows spaced apart each other in sub-scanning direction.

10. The image processing method as claimed in claim 8, wherein the plurality of color tone values are arranged to be changed in the same direction as in each of the plurality of the patch rows.

11. The image processing method as claimed in claim 8, wherein the plurality of color tone values are arranged to have the same value among the plurality of the patch rows at the same position in the main scanning direction.

12. The image processing method as claimed in claim 7, further comprising:
   detecting an edge portion included in the patch row; and
   performing different screening process in a case where the edge portion is detected by the edge detecting portion and in a case where the edge portion is not detected by the edge detecting portion.

13. A non-transitory computer-readable recording medium storing an image processing program for executing the image processing method as claimed in claim 7.

* * * * *

UNITED STATES PATENT AND TRADEMARK OFFICE
CERTIFICATE OF CORRECTION

PATENT NO. : 8,610,950 B2
APPLICATION NO. : 12/801034
DATED : December 17, 2013
INVENTOR(S) : Hiroshi Ishii Page 1 of 1

It is certified that error appears in the above-identified patent and that said Letters Patent is hereby corrected as shown below:

On the title page item (73), should read, Ricoh Company, Ltd., Tokyo (JP)

Signed and Sealed this
First Day of April, 2014

Michelle K. Lee
*Deputy Director of the United States Patent and Trademark Office*